(12) United States Patent
Henry et al.

(10) Patent No.: US 12,736,159 B2
(45) **Date of Patent: *Sep. 15, 2026**

(54) FITTING ASSEMBLY FOR COLLAPSE-RESISTANT HOSE

(71) Applicant: Parker-Hannifin Corporation, Cleveland, OH (US)

(72) Inventors: Ty A. Henry, Atwater, OH (US); Steven M. Powell, Chardon, OH (US); Joshua M. Wolff, Stow, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/947,310

(22) Filed: Nov. 14, 2024

(65) Prior Publication Data

US 2025/0067376 A1 Feb. 27, 2025

Related U.S. Application Data

(63) Continuation of application No. 18/067,084, filed on Dec. 16, 2022, now Pat. No. 12,169,037.

(Continued)

(51) Int. Cl.
*F16L 33/207* (2006.01)
*F16L 33/18* (2006.01)

(52) U.S. Cl.
CPC ........... *F16L 33/2076* (2013.01); *F16L 33/18* (2013.01); *F16L 33/2071* (2013.01)

(58) Field of Classification Search
CPC ....... F16L 33/2076; F16L 33/18; F16L 33/20; F16L 33/207; F16L 33/2075; F16L 13/141; F16L 33/01; F16L 33/2071
See application file for complete search history.

(56) References Cited

U.S. PATENT DOCUMENTS 3,117,808 A * 1/1964 Swick, Jr.
3,140,106 A * 7/1964 Thomas ................. F16L 33/01

(Continued)

OTHER PUBLICATIONS

HCRV-8 (1/2"—5,000 psi Collapse Resistant Oil & Gas Hose); HCVR-16 (1"—5,000 psi Collapse Resistant Oil & Gas Hose), "CAT 4900—Parker Ultra High Pressure Thermoplastic Hose, Fittings and Accessories 2022," pp. 106-107, Nov. 2022, obtained from: https://ph.parker.com/us/en/high-collapse-resistant-hose-hcr/hcrv-16-hcrv-16.

(Continued)

*Primary Examiner* — William S. Choi
(74) *Attorney, Agent, or Firm* — Renner, Otto, Boisselle & Sklar

(57) ABSTRACT

A hose fitting assembly for a collapse-resistant hose, includes a sleeve having a forward and rearward sleeve end portion, the rearward sleeve end portion having an opening adapted to receive a hose end portion; a fitting having an optionally flared rearward fitting end portion operatively coupled to the forward sleeve end portion, the rearward fitting end portion having an internal surface forming an internal cavity configured to receive the hose end portion; and an optionally threaded nipple operatively couplable to the fitting and extending rearwardly through the internal cavity of the fitting, the nipple being configured to fit within an internal hose passage. The fitting assembly may include a seal mounted in fitting and sealable against the core tube upon crimping. The fitting assembly may include a support ring between skived and unskived hose regions. A collapse-resistant hose includes a carcass with an optional unbonded sacrificial layer is also provided.

14 Claims, 14 Drawing Sheets

Related U.S. Application Data

(60) Provisional application No. 63/291,688, filed on Dec. 20, 2021.

(56) References Cited

U.S. PATENT DOCUMENTS

| | | | |
|---|---|---|---|
| 3,148,898 | A | 9/1964 | Somers |
| 3,237,974 | A * | 3/1966 | Press |
| 4,627,644 | A * | 12/1986 | Ekman |
| 6,860,520 | B2 * | 3/2005 | Schwab |
| 8,888,140 | B2 | 11/2014 | Stroempl et al. |
| 10,753,522 | B2 | 8/2020 | Peckeu et al. |
| 10,883,636 | B2 | 1/2021 | Schilling et al. |
| 2004/0032124 | A1 | 2/2004 | Lefere et al. |
| 2009/0308478 | A1 | 12/2009 | Vo |
| 2021/0156498 | A1 | 5/2021 | Dhagat et al. |
| 2021/0156499 | A1 | 5/2021 | Leger et al. |

OTHER PUBLICATIONS

Extended European Search Report issued for counterpart European Patent Application No. 22214639.1, mailed May 9, 2023.

* cited by examiner

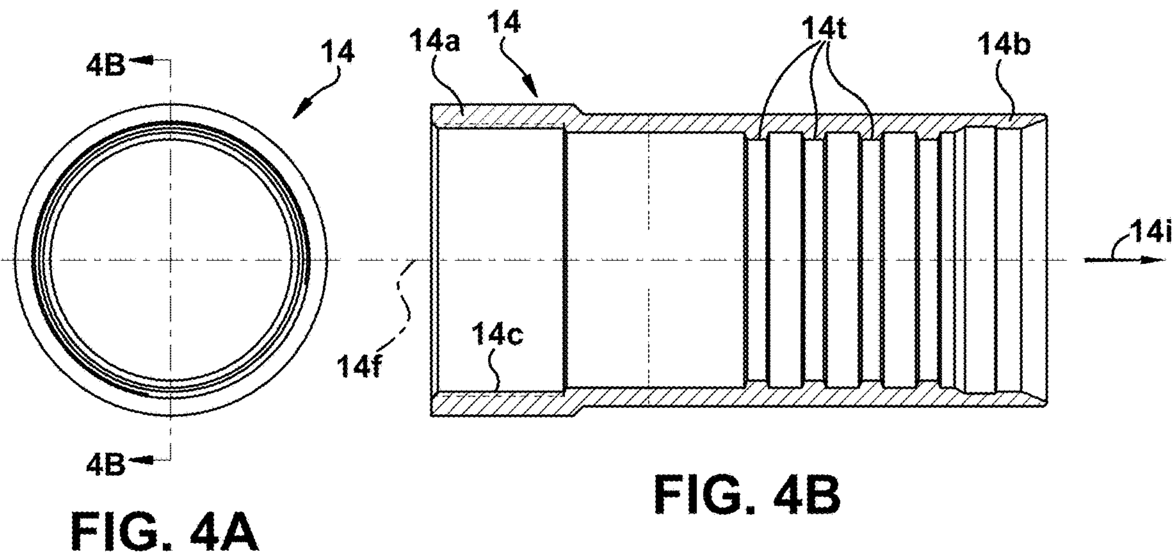
FIG. 4A
FIG. 4B
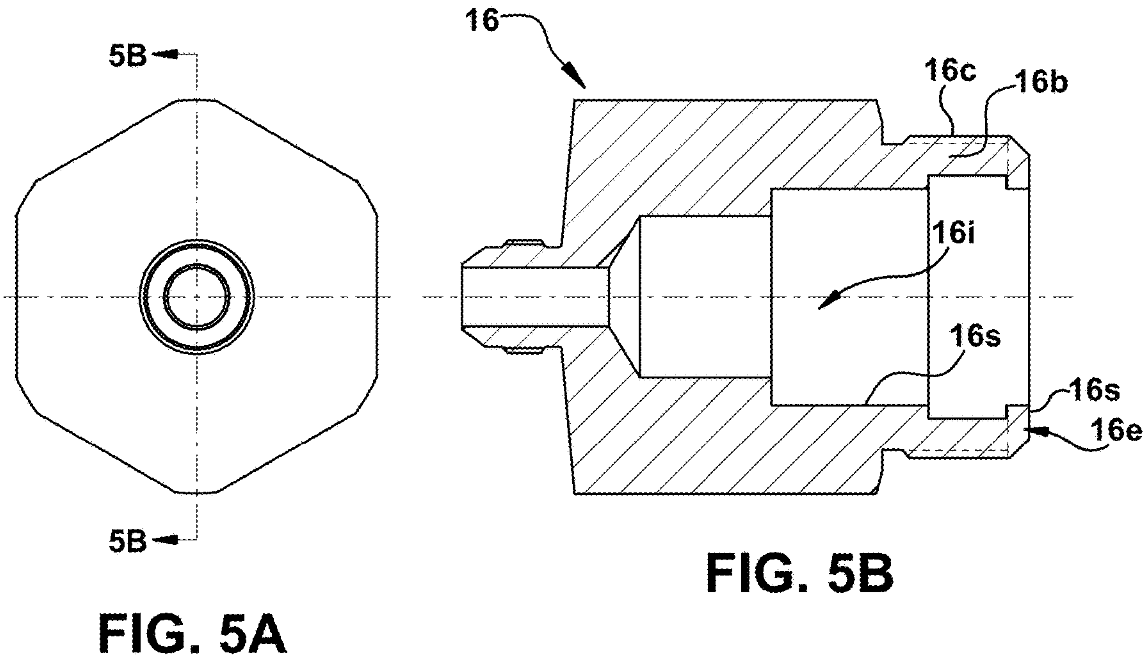
FIG. 5A
FIG. 5B

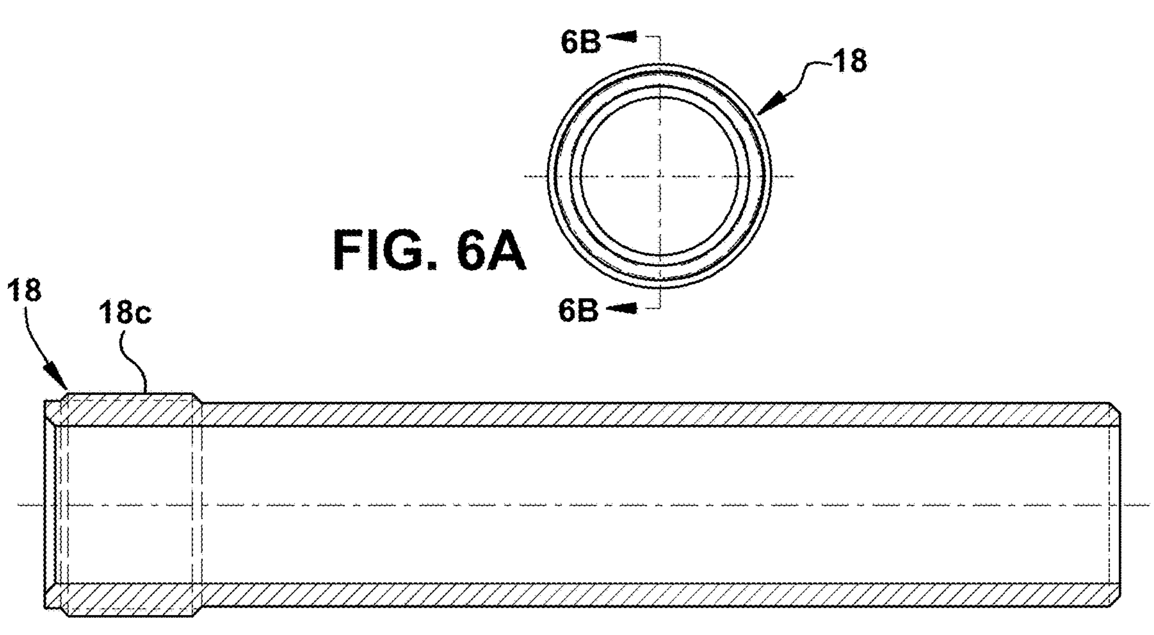
FIG. 6A
FIG. 6B
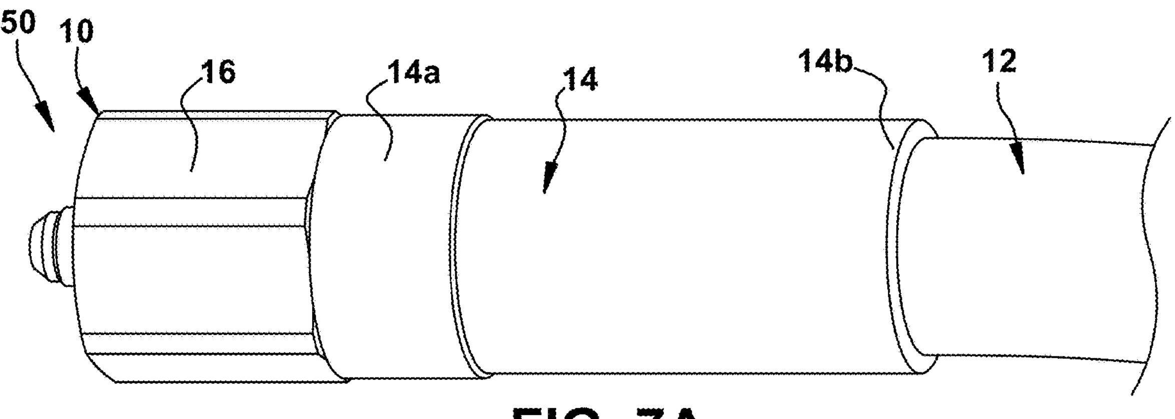
FIG. 7A
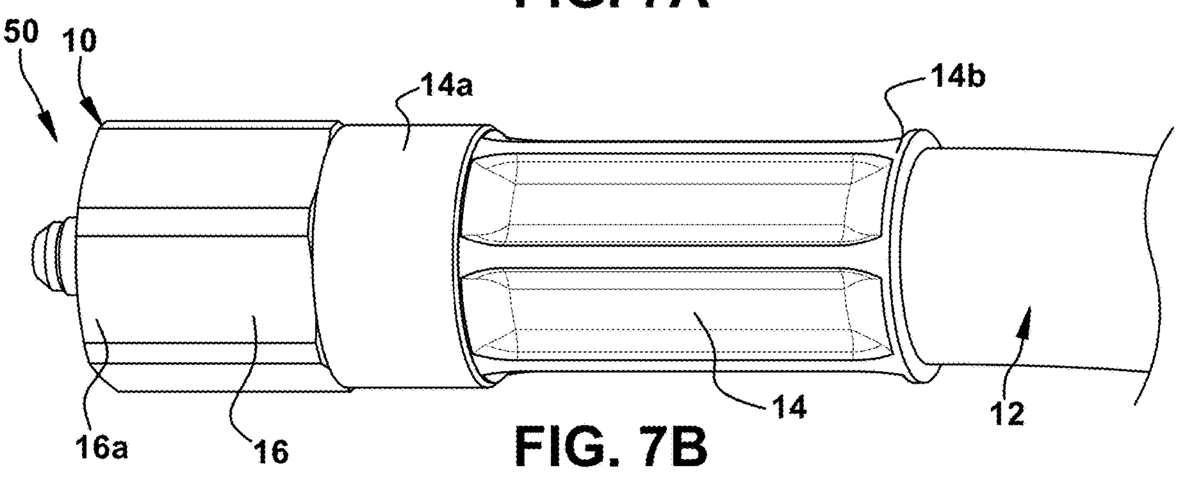
FIG. 7B

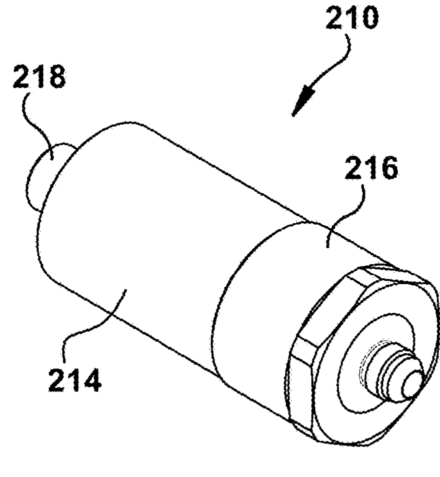
FIG. 11A
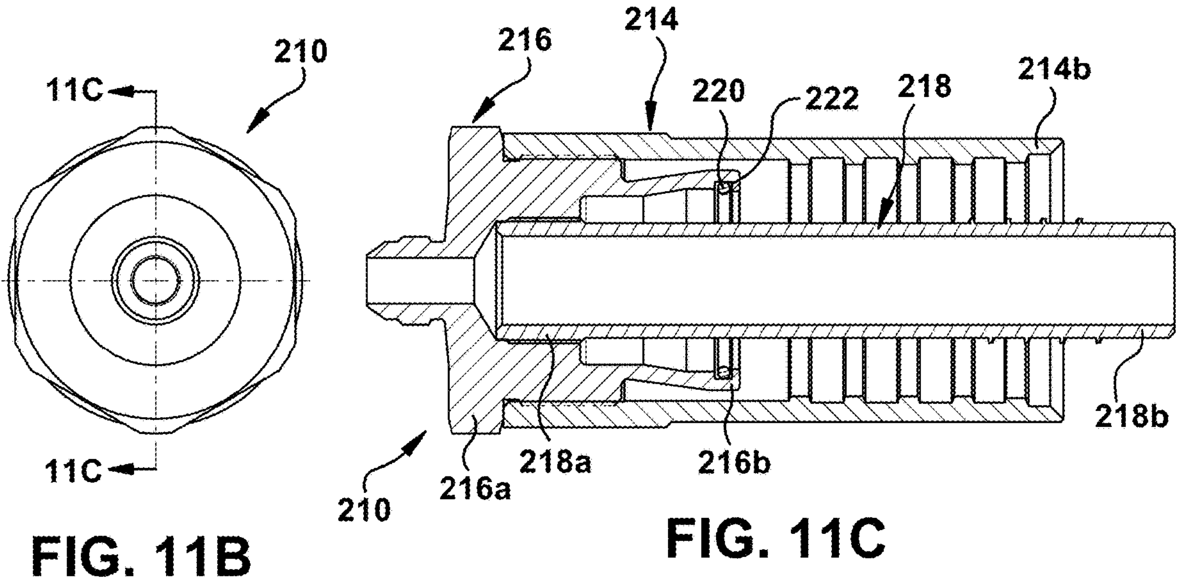
FIG. 11B
FIG. 11C

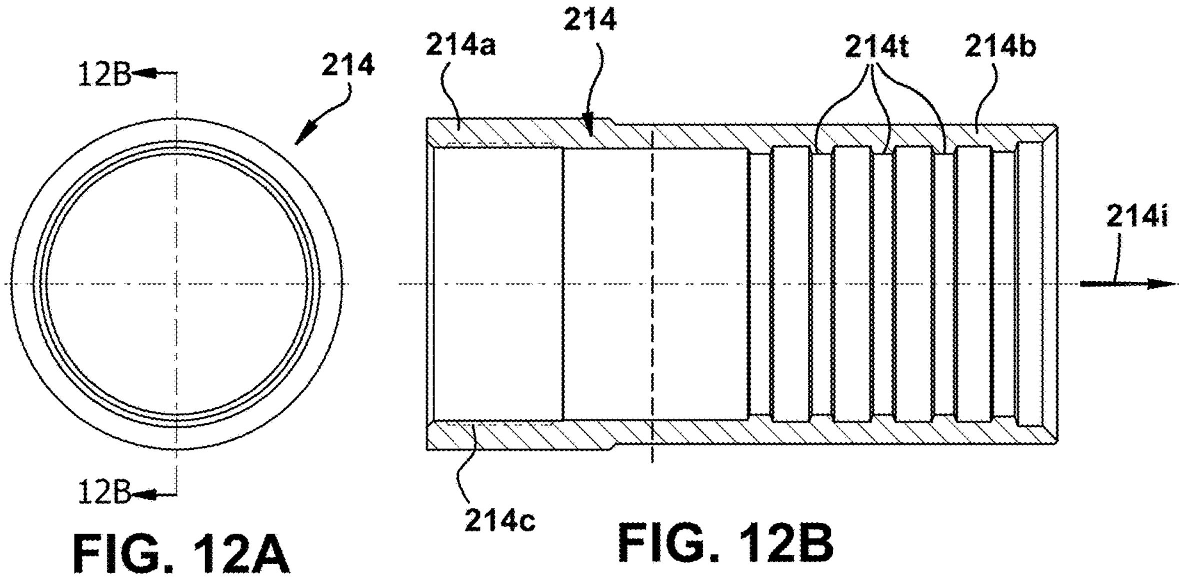
FIG. 12A
FIG. 12B
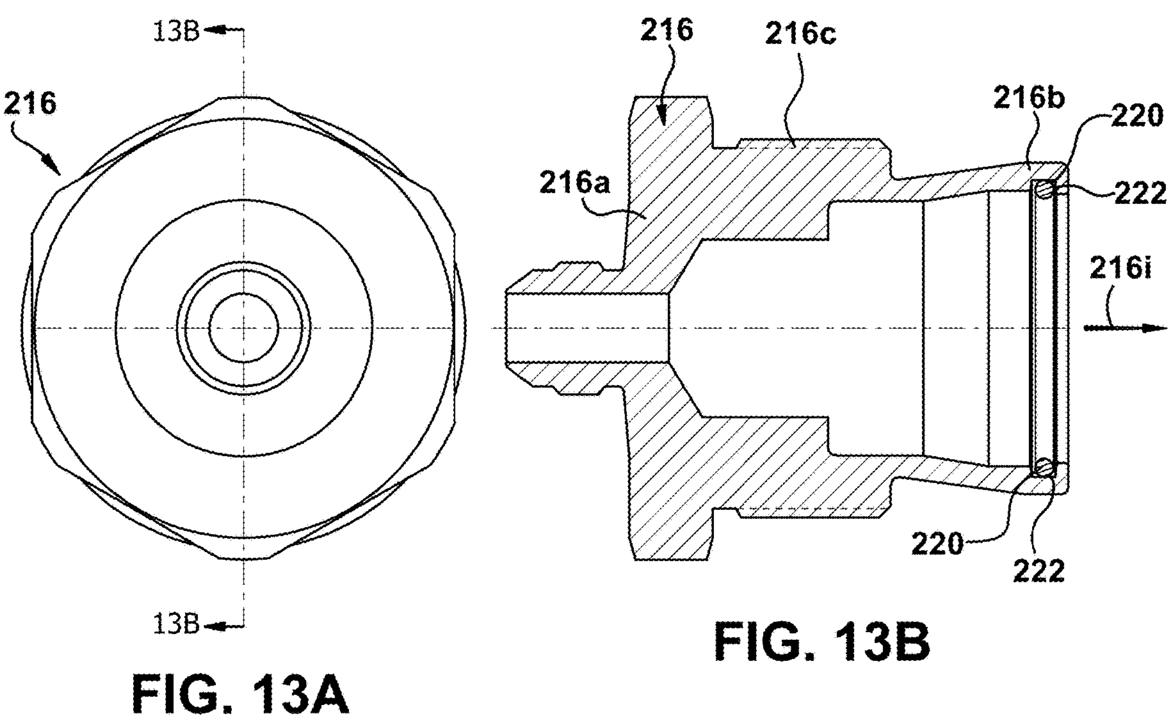
FIG. 13B
FIG. 13A 212
218b
214b
202a
214
202b
220
222
216b
222
220
201b
201a
214a
218
210
250
216a
218a

FITTING ASSEMBLY FOR COLLAPSE-RESISTANT HOSE

RELATED APPLICATIONS

This application is a continuation of U.S. application Ser. No. 18/067,084 filed Dec. 16, 2022, which claims the benefit of U.S. Provisional Application No. 63/291,688 filed Dec. 20, 2021, which are hereby incorporated herein by reference.

TECHNICAL FIELD

The present invention relates generally to fitting assemblies for hoses, and more particularly to hose fitting assemblies suitable for use in deep subsea applications, such as for blow-off preventers (BOP), hydraulic hoses, flying leads, hotline hoses, hoses used with subsea umbilicals, or the like.

BACKGROUND

Hose fittings and hose assemblies may be subjected to substantial pressures depending on the application. In one exemplary application, hydraulic hoses may be employed in deep undersea drilling operations, including in blow-off preventers that close off drilling operations in case of a catastrophic failure. The hose and fittings used in such undersea drilling operations may experience high external subsea pressures, such as about 5,000 psi to about 10,000 psi maximum working pressure. As such, the hoses used in such applications typically are collapse-resistant hoses that include an internal carcass that prevents collapsing of the hose due to the high external subsea pressures.

One conventional way to install a fitting on such a collapse-resistant hose is to remove or skive an outer portion of the hose down to an inner portion that includes the carcass, insert the skived portion into a sealing sleeve or "shell" of the fitting, and then crimp the sleeve onto the outer portion of the hose, in which a sealing element of the crimped sleeve sealing engages the outer sheath layer of the hose. Another way to install a collapse-resistant hose into a hose fitting assembly is to manipulate the carcass itself, such as by removing or cutting a portion of the carcass. Manipulation of the carcass, however, is often a difficult process.

SUMMARY

A persistent problem with hose fitting assemblies used in severe service applications, such as in high-pressure subsea applications, is that the high-pressure external environment may leak into the hose construction, typically at the interface with the installed hose fitting assembly. For example, in a high-pressure subsea application, seawater may leak into the hose construction at the fitting, which can cause corrosion to the hose and/or fitting over time and can ultimately result in failure of the hose and/or fitting.

At least one aspect of the present disclosure provides a unique hose fitting assembly that enhances the sealing functionality of the design. For example, in a subsea application, the unique hose fitting assembly can substantially preclude ingress of seawater into the hose construction via the fitting assembly, and thereby substantially reduce the propensity for corrosion or other damage to the hose and hose fitting. As such, the unique hose fitting assembly can increase the longevity and performance of the overall hose assembly.

According to an aspect, a hose fitting assembly is provided for a collapse-resistant hose with at least one inner layer and an outer sheath layer. The hose fitting assembly includes: a sleeve having a forward sleeve end portion and a rearward sleeve end portion, the rearward sleeve end portion having an opening adapted to receive an end portion of the collapse-resistant hose; a fitting having a rearward fitting end portion that is operatively coupled to the forward sleeve end portion; the rearward fitting end portion having an internal surface that forms an internal cavity configured to receive an end portion of the at least one inner layer of the collapse-resistant hose; a nipple operatively coupled to the fitting and extending in a rearward direction through the internal cavity of the fitting, the nipple being configured to fit within an internal passage of the collapse-resistant hose; and at least one seal operatively mounted in the internal cavity of the fitting and configured to seal against an outer surface of the at least one inner layer of the collapse-resistant hose.

Such an exemplary hose fitting assembly may improve the sealability of the design by sealing against the inner layer of the hose assembly, such as by sealing against an exposed portion of the inner core tube of the hose assembly. Such sealing functionality may be provided alternatively or additionally to a seal engaging the outer sheath layer of the hose. The external subsea pressure may energize the seal against the inner layer to improve sealing performance. As a result, the unique fitting assembly may achieve higher burst pressures than otherwise could be achieved by crimping and sealing with the sleeve or shell alone.

In addition, a collapse-resistant hose assembly has unique assembly challenges due to the structural carcass, which these assembly challenges can be reduced with the unique fitting assembly according to the present disclosure. In particular, the carcass of the collapse-resistant hose may be difficult to manipulate during assembly, and the hose fitting assembly according to the present disclosure allows for ease and repeatability of manufacturing of the assembly while providing a suitable seal.

In exemplary embodiment(s), the rearward fitting end portion of the hose fitting assembly may be flared radially outwardly to receive the end portion of the collapse-resistant hose. This enables insertion of the hose into the fitting assembly without displacement of the seal, which allows for repeatability of the assembly process. The flared rearward end portion of the fitting is configured to be crimped radially inwardly into a sealed state in which the at least one seal engages with the outer surface of the at least one inner layer of the collapse-resistant hose. This crimping and sealing against the inner layer improves the sealing functionality of the collapse-resistant hose design.

In exemplary embodiment(s), the nipple of the fitting assembly may be threaded to threadedly engage with a threaded inner surface of the collapse-resistant hose. This improves retention and reduces separation of the fitting assembly with the hose when operating under pressure. The threaded nipple also maintains the position of the fitting assembly in the uncrimped state to permit crimping in place.

According to another aspect, a method of assembling a collapse-resistant hose assembly includes: providing a hose fitting assembly including a sleeve, a nipple, and a fitting, wherein the fitting includes a rearward fitting end portion; providing a collapse-resistant hose with at least one inner layer and at least one outer sheath layer; removing at least an end portion of at least the outer sheath layer to expose an outer surface of the at least one inner layer; inserting the end of the at least one inner layer of the collapse-resistant hose into the hose fitting assembly to form an uncrimped intermediate state; and deforming at least the rearward fitting end portion radially inwardly to engage at least one seal with at least one outer surface of the at least one inner layer of the collapse-resistant hose.

According to another aspect, a collapse-resistant hose assembly includes a hose fitting assembly and the collapse-resistant hose, wherein the collapse-resistant hose includes: an inner portion including a structural carcass, a core tube and an outer portion, the outer portion including a fiber-reinforced layer and an outer sheath layer; and a sacrificial unbonded tube layer surrounding, but not bonded to, the core tube.

The sacrificial unbonded tube layer facilitates ease of removal of the reinforcement layer or any other outer layer by functioning as a cutting board, scoring board, or backstop to which a cutting means may be applied. This may allow for ease of removal of the layers surrounding the sacrificial layer during the skiving process while also having an additional potential benefit of a reduced or negligible risk of cutting, scoring, or otherwise damaging the core tube.

The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIGS. 4A and 4B show a sleeve of the exemplary fitting assembly in further detail.

FIGS. 5A and 5B show a fitting of the exemplary fitting assembly in further detail.

FIGS. 6A and 6B show a nipple of the exemplary fitting assembly in further detail.

FIG. 7A shows the hose inserted into the hose fitting assembly to form an uncrimped intermediate state of a collapse-resistant hose assembly. FIG. 7B shows the hose inserted into the fitting assembly after the fitting assembly has been crimped onto the outer sheath layer of the hose to form a final assembled condition of the collapse-resistant hose assembly.

FIG. 11A shows an exemplary hose fitting assembly for use with a collapse resistant hose according to a second embodiment. FIG. 11B is an end view of an exemplary hose fitting assembly according to a second embodiment. FIG. 11C is a cross-sectional side view of the exemplary hose fitting assembly.

FIGS. 12A and 12B show a sleeve of the second embodiment of the exemplary hose fitting assembly in further detail.

FIGS. 13A and 13B show a fitting of the second embodiment of the fitting assembly in further detail.

DETAILED DESCRIPTION

The principles and aspects according to the present disclosure have particular application to fitting assemblies for collapse-resistant hoses, such as for subsea applications, and thus will be described below chiefly in this context. It is understood, however, that principles and aspects according to the present disclosure may be applicable to other fluid systems where desirable.

Figure 1:
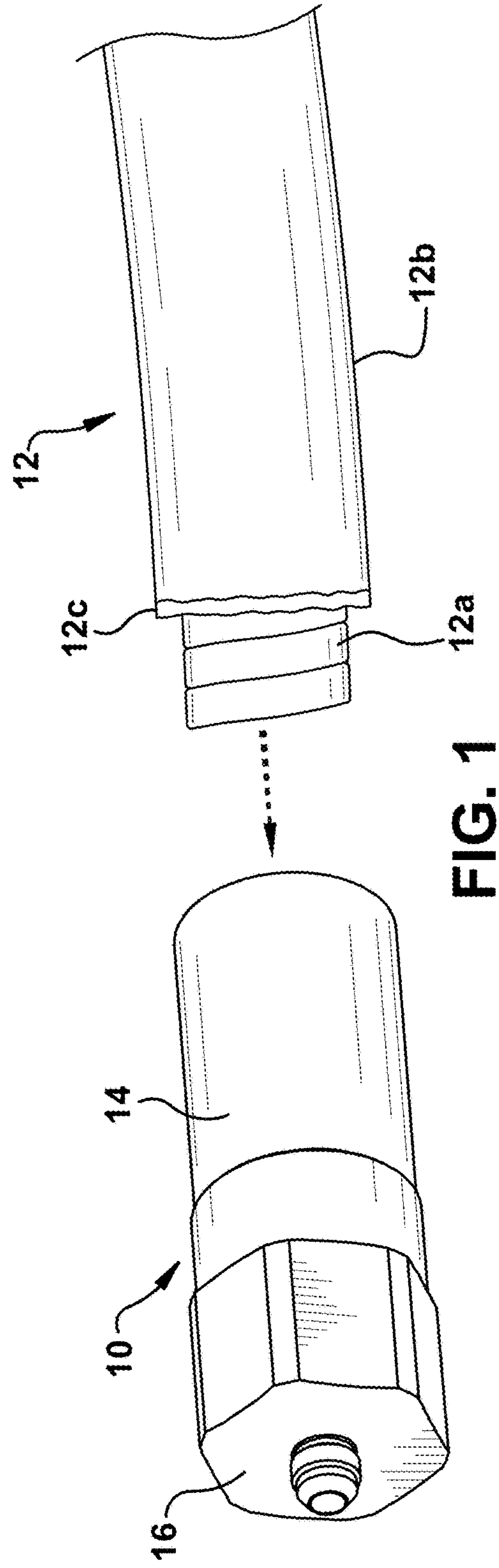
FIG. 1 shows an exemplary hose fitting assembly for use with a collapse-resistant hose according to an embodiment.

Referring to FIG. 1, an exemplary hose fitting assembly 10 for use with a collapse-resistant hose 12 is shown. As shown in the illustrated embodiment, the exemplary hose fitting assembly 10 may be configured to attach to a skived hose 12, which includes a skived portion 12*a* and an un-skived portion 12*b*. A skived portion 12*a* of the collapse-resistant hose 12 is a portion in which at least a portion of the sheath layer 2*b* is removed. Alternatively or additionally, other layers of the hose 12 may be removed such as one or more reinforcement layers 2*a* during the skiving process. The skived portion 12*a* of the collapse-resistant hose 12 is located on a hose end. Skiving of the hose 12 typically exposes the core tube 1*b* of the hose 12 but can also expose any layer beneath the outer sheath layer 2*b*. The transition region 12*c* between the skived portion 12*a* and the unskived portion 12*b* has exposed ends of one or more of the layers of the outer portion 2. The exposed end layers of the outer portion 2 in the transition region 12*c* may include the ends of one or more reinforcement layers 2*a* and the end of the outer sheath layer 2*b*.

Figure 2:
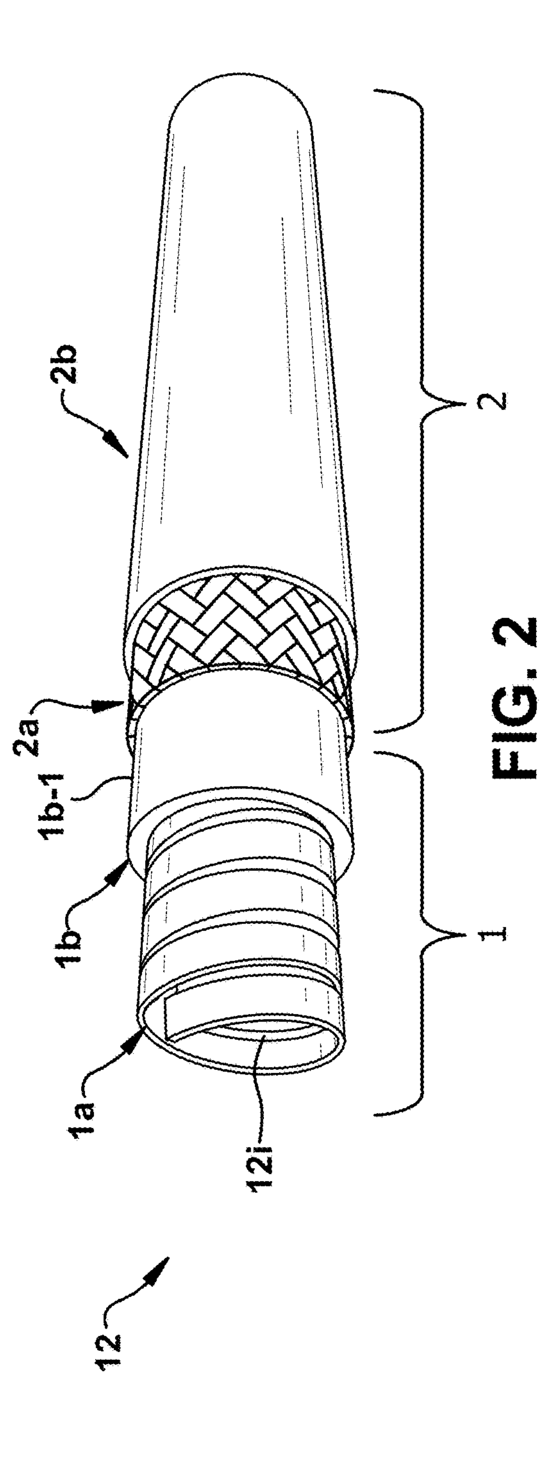
FIG. 2 shows the different layers of the collapse resistant hose according to an embodiment.

FIG. 2 shows the different layers of the collapse resistant hose 12 according to an embodiment. As shown, the hose 12 may include an inner portion 1 (or core portion) and an outer portion 2. The inner portion 1 may include a carcass 1*a* and a core tube 1*b*. The outer portion 2 may include the reinforcement layer(s) 2*a* and the outer sheath layer 2*b*. One or more additional layers also may be provided in the inner portion 1 or the outer portion 2.

The carcass 1*a* may provide structural support for the core tube 1*b* and for any other layers of the hose 12. The structural support provided by the carcass 1*a* may be useful at subsea, high-pressure conditions. The carcass 1*a* may be made from interlocking members to make the carcass 1*a* sufficiently flexible for the application. The interlocking members may be metal interlocking members, such as stainless steel or the like. The interlocking members may also be made of any other suitable material such as any number of polymeric materials.

The core tube 1*b* serves as a layer to protect the fluid in the hose passage 12*i* from the external environment and serves to protect the reinforcement layers 2*a* from the fluid. The core tube 2*b* prevents fluid from entering the internal hose construction or the environment and the core tube 1*b* protects the fluid from being contaminated by the external environment. The core tube 1*b* may be made from a suitable flexible polymer, such as polyamide, polyurethane, any number of plastic or elastomeric materials, fluoropolymers, or the like, with considerations for physical and chemical compatibility with transported and environmental fluids. In exemplary embodiments, the core tube 1*b* is made of a seamless construction. Alternatively, the core tube 1*b* may be made of multiple core tube segments connected together on their ends, spliced, or connected in any other suitable manner for the particular application. The core tube 1*b* may include a single extruded layer, a coextruded layer including one or more polymer layers, a composite construction including one or more materials, or a wrapped construction. The core tube 1*b* may also be formed with any other number of plastic manufacturing processes such as injection molding.

The fiber reinforcement layer 2*a* serves as internal radial support for the hose 12 which allows it to withstand high operating pressures. The fiber reinforcement layer 2*a* of the outer layer may include any number of types of reinforcement such as fiber or metal braids and supportive metal spirals. The fiber reinforcement layer 2*a* may include braided fibers, such as aramid fiber, which may permit sufficient flexibility to the hose 12. The fiber reinforcement may also include any other number of braided natural, metal, polymeric materials, and/or any other material suitable for reinforcing the hose 12 while permitting sufficient flexibility. The fiber reinforcement layer 2*a* may include any number of physical or chemical bonding agents to facilitate bond between multiple reinforcement layers 2*a* and/or between a reinforcement layer 2*a* and an adjacent hose layer such as the outer sheath layer 2*b* and/or the core tube layer 1*b*.

The sheath layer 2*b* is the outermost layer of the hose 12 which protects the internal construction of the hose 12 from the outside environment. The outer sheath layer 2*b*, which also may be referred to as a cover layer, may be made of a suitable polymer to also facilitate flexibility, abrasion resistance, permeation resistance, and/or seawater resistance, such as polyurethane or the like. The cover material may be selected as suitable to environmental and operating conditions of the finished hose assembly. The cover material may also include any other type of polymeric, thermoplastic, elastomeric, fluoropolymer, and/or composite material. An example of such a hose is Parflex HCR (high collapse-resistant) hoses (e.g., HCR-16) made by Parker-Hannifin Corporation of Cleveland, OH. The cover material may be formed on the outer surface (e.g., 1*b*-1) of the inner layers 1 via any suitable method such as extrusion or wrapping. The outer sheath layer 2*b* may have any suitable thickness based on considerations including but not limited to fitting compatibility, operating conditions, flexibility requirements, and environmental concerns.

Figures 3A, 3B:
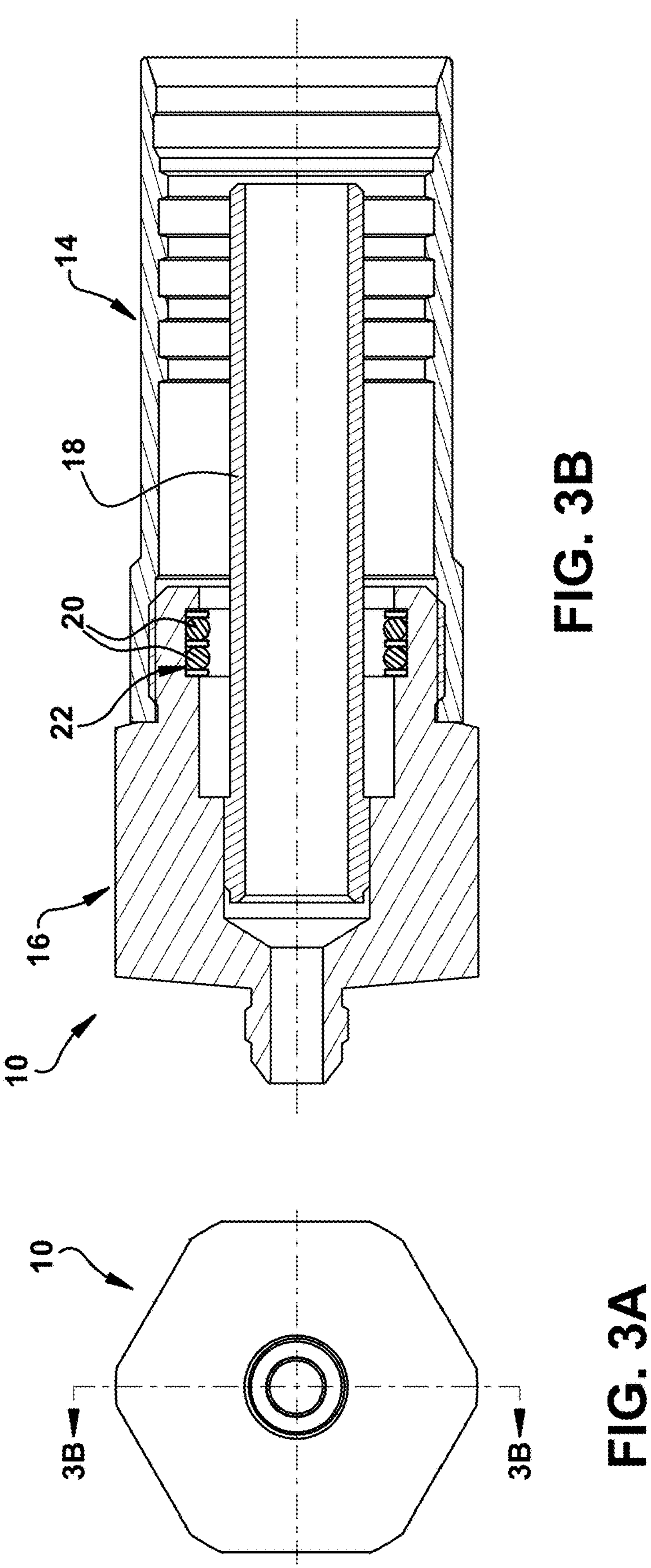
FIG. 3A is an end view of the exemplary hose fitting assembly.
FIG. 3B is a cross-sectional side view of the exemplary hose fitting assembly.

FIG. 3A is an end view of the exemplary hose fitting assembly 10. FIG. 3*b* is a cross-sectional side view of the exemplary hose fitting assembly 10. As shown, the hose fitting assembly 10 includes a sleeve 14 that is configured to receive an end portion of the hose 12, a fitting 16 that is operatively coupled to the sleeve 14, and a nipple 18 operatively coupled to the fitting 16. The components of the assembly 10 may be connected using any suitable connection means such as push fitting, threading, brazing, welding, or the like. As described in further detail below, the assembly 10 also includes at least one seal 20 that is operatively mounted to the fitting 16 (such as via seal groove 22), in which the seal 20 is configured to seal against an outer surface of an inner layer 1 of the hose 12 such as an outer surface 1*b*-1 of the core tube 1*b* of the hose 12. By sealing against the exposed external surface of an inner layer of the hose, such as the core tube 1*b* (with carcass 1*a* still intact), the assembly 10 improves over conventional assemblies that use the crimped sealing sleeve 14 because it provides a higher burst pressure while maintaining ease and repeatability of assembly. In exemplary embodiments, the one or more seals 20 are energized by the external pressure and/or the crimped fitting 16 to enhance the sealing between the hose fitting assembly 10 and the hose 12.

FIGS. 4A and 4B show the sleeve 14 in further detail. As shown, the sleeve 14 has a forward sleeve end portion 14*a* and a rearward sleeve end portion 14*b*. The rearward sleeve end portion 14*b* includes an opening 14*i* adapted to receive an end portion of the hose 12. The end portion of the hose 12 which may be received by the rearward sleeve end portion 14*b* may include all of the hose layers, some of the hose layers, or a portion of the hose layers. The forward sleeve end portion 14*a* is adapted to operatively couple with the fitting 16 by any suitable means such as threading, welding, brazing, or any other fixing means via the forward sleeve end portion opening 14*f*. In exemplary embodiments, the sleeve 14 may include one or more radially inwardly protruding teeth 14*t* that are configured to cut, grip, and/or bite into the outer portion of hose 12 including but not limited to the outer sleeve layer 2*b* when the sleeve 14 is radially inwardly deformed or crimped to the hose 12. This crimping restricts movement of the hose 12 relative to the fitting assembly 10 and enables the assembly to function under pressure.

The crimping action may deform any portion of the hose fitting assembly 10, but in particular may deform the sleeve 14. The crimping may be performed to selected dimensions and shapes depending on the size of the hose 12, the size of the fitting assembly 10, the operating conditions, environmental conditions, availability of crimpers at the assembly site, or any other number of other factors. The deforming or crimping may include any number of suitable means such as manual or automatic hose crimping devices or implements. One or more of the teeth 14*t*, ridges, or other features on the sleeve 14 or shell may provide sealing functionality, such as the radially protruding ridges (teeth) 14*t* shown in FIG. 4B. In addition to sealing functionality, the teeth 14*t* may support hose retention during crimping of the hose fitting assembly 10 onto the hose 12 and when the hose 12 is pressurized, operating, being transported, being adjusted, or based on any other considerations before, during, and after the life cycle of the hose fitting assembly 10 and/or the collapse-resistant hose assembly 50. The number and thickness of teeth 14*t* on the sleeve 14 may vary depending on the requirements of the finished collapse-resistant hose assembly 50.

FIGS. 5A and 5B show the exemplary fitting 16 in further detail. As shown, the fitting 16 includes rearward fitting end portion 16*b* that is configured to operatively couple to the forward sleeve end portion 14*a* of the sleeve 14. In the illustrated embodiment, the fitting 16 includes threads 16*c* that threadedly engage with corresponding threads 14*c* of the sleeve 14. The rearward fitting end portion 16*b* has an internal surface 16*s* that forms an internal cavity 16*i* or inner cavity configured to receive the end portion of the hose 12. In the illustrated embodiment, the internal cavity 16*i* of the fitting 16 is adapted to receive the skived portion 12*a* of the hose 12, and the sleeve 14 is configured to contain the un-skived portion 12*b* of the hose 12 in which either no hose layers are removed, or no portion of the hose layers are removed, including but not limited to the outer sheath layer 2*b*. An end face 16*e* of the rearward fitting end portion 16*b* may serve as a stop 16*s* between the skived and un-skived portions of the hose 12 (as is apparent in FIG. 3B). The stop 16*s* may restrict at least the end of the outer sheath layer 2*b* from entering the internal cavity 16*i* of the fitting 16 when the collapse-resistant hose assembly 50 is in both an intermediate uncrimped state and in an assembled and crimped state. The opposite forward fitting end portion 16*a* is configured to couple to another suitable coupling of the subsea system, such as via a nipple 18 or the like. The fitting 16 may also have any other number of adapters on the forward fitting end portion 16*a* configured to connect the hose fitting assembly 10 with any number of additional hose assemblies, valves, ports, hydraulic systems, fluid sources, or the like. The forward fitting end portion 16*a* may also include a male or female adapter of any different size suitable to the application or any other number of suitable connectors dependent on the end use of the hose assembly 50.

As described above, the one or more seals 20 (shown in FIG. 3*b*) are operatively mounted in the internal cavity 12*i* of the fitting 10 via one or more seal grooves 22 and are configured to seal against an outer surface of the inner layer 1 of the hose 12. In the illustrated embodiment, because the fitting 16 is configured to receive the skived portion 12*a* of the hose 12, which includes the core tube 1*b* and carcass 1*a*, the seals 20 are configured to sealingly engage against the core tube 1*b* which forms an outer (exposed) surface of the at least one inner layer of the hose 12 at this location. In exemplary embodiments, the inner diameter formed by the seals 20 is smaller than the outer diameter formed by the core tube 1*b*, which results in interference and sealing upon assembly of the fitting assembly 10 with the hose 12. The inner and outer diameters of the seals 20 and the core tubes 1*b* may be tailored to each other to achieve a desired sealing interference for the application.

The seals 20 may be any suitable shape and/or may be made of any suitable material. In exemplary embodiments, the seals 20 are elastomeric O-ring seals, however the seals may be made of any polymeric material or material containing the requisite properties suitable for the purpose of sealingly engaging with the core tube during the assembled and uncrimped state and/or the assembled and crimped state of the collapse-resistant hose assembly 50. Alternatively or additionally, the seals 20 may be energized by the external pressure when in use (e.g., subsea pressure), which enhances the sealing functionality between the fitting 16 and the hose 12. As shown, the seals 20 may be contained in the seal groove 22, which is formed in the internal surface of the fitting 16.

FIGS. 6A and 6B show the nipple 18 in further detail. As shown, the nipple 18 is configured to operatively couple to inner portion of the fitting 16, such as via threads 18*c*, press-fitting, or the like. The nipple 18 also could be unitary with the fitting 16 or be fixed to the fitting in any suitable manner such as welded, brazed, or otherwise permanently or removably attached. The nipple 18 extends in a rearward direction through the internal cavity 16*i* of the fitting 16 and is configured to fit within at least a portion of an internal passage 12*i* of the hose 12. In exemplary embodiments, the nipple 18 extends beyond the stop formed by the end face 16*e* of the rearward fitting end portion 16*b*, such that a rearward end of the nipple 18 is surrounded by a portion of the sleeve 14. Such a nipple design enables fitting retention of the nipple 18 in the carcass 1*a* of the hose 12 and provides ease of assembly of the collapse-resistant hose assembly 50.

Because the nipple 18 extends beyond the location of the seals 20, the exposed core tube 1*b* is squeezed between the seals 20 and nipple 18 to provide a suitable seal. Such sealing functionality improves upon using the sleeve 14 to provide sealing alone. As such, the seals 20 may be used in lieu of a sealing force provided by the sleeve 14 (e.g., via teeth 14*t*); or the seals 20 may be used in addition to the sealing provided by the sleeve 14. The seal 20 may have various diameters based on the desired sealing properties. For example, the seal 20 may have an inner diameter that is smaller than the outer diameter of the core tube 1*b* or smaller than an inner and/or outer diameter of any other desired layer of the collapse-resistant hose 12. The seal 20 may also have an inner diameter that is larger than the outer diameter of the core tube 1*b* of the hose 12 or larger than any other layer of the hose 12.

FIG. 7A shows the fitting assembly 10 assembled to the hose 12 to form a collapse-resistant hose assembly 50, but with the sleeve 14 in an uncrimped state. As shown, the hose 12 is inserted into the sleeve 14 at an appropriate insertion depth such that the skived portion 12*a* and the unskived portion 12*b* reach an appropriate position in the hose fitting assembly 10 prior to crimping or deformation of the hose fitting assembly 10.

FIG. 7B shows the collapse-resistant hose assembly 50 shown in FIG. 7A in a final assembled condition in which the sleeve 14 of the fitting assembly 10 has been crimped or deformed radially inwardly to the outer sheath of the hose 12 to permanently fix the hose fitting assembly 10 to the hose 12. The crimping or deformation of the hose fitting assembly 10 into the hose 12 may cover a range of crimp diameters, crimp lengths, or crimp widths over the sleeve 14. The crimp deformations into the hose fitting assembly 10 may take the form of a variety of patterns of imprinting, full or partial radial deformation, or the like. The crimp deformations may be in the form of imprinting "strips" that extend from proximal the forward sleeve portion 14*a* rearwardly toward the rearward sleeve portion 14*b*. The crimp deformations may also extend in any other variety of directions and in any variety of shapes or patterns suitable for the application.

Figure 8A:
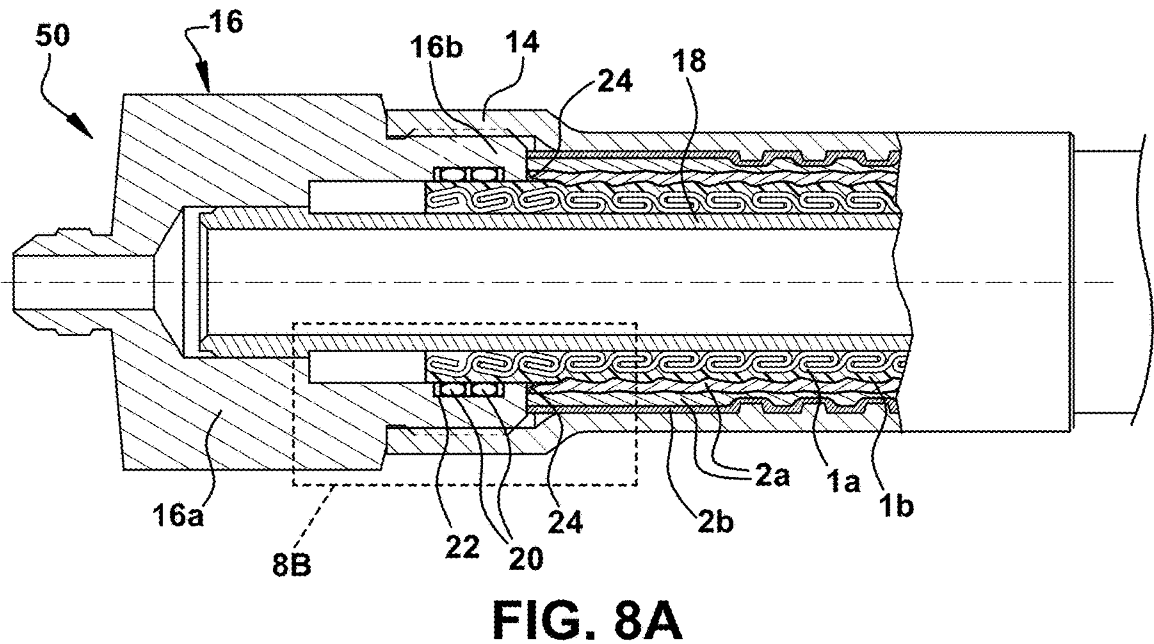
FIG. 8A is a cutaway view of the collapse-resistant hose assembly in FIG. 7B.
Figure 8B:
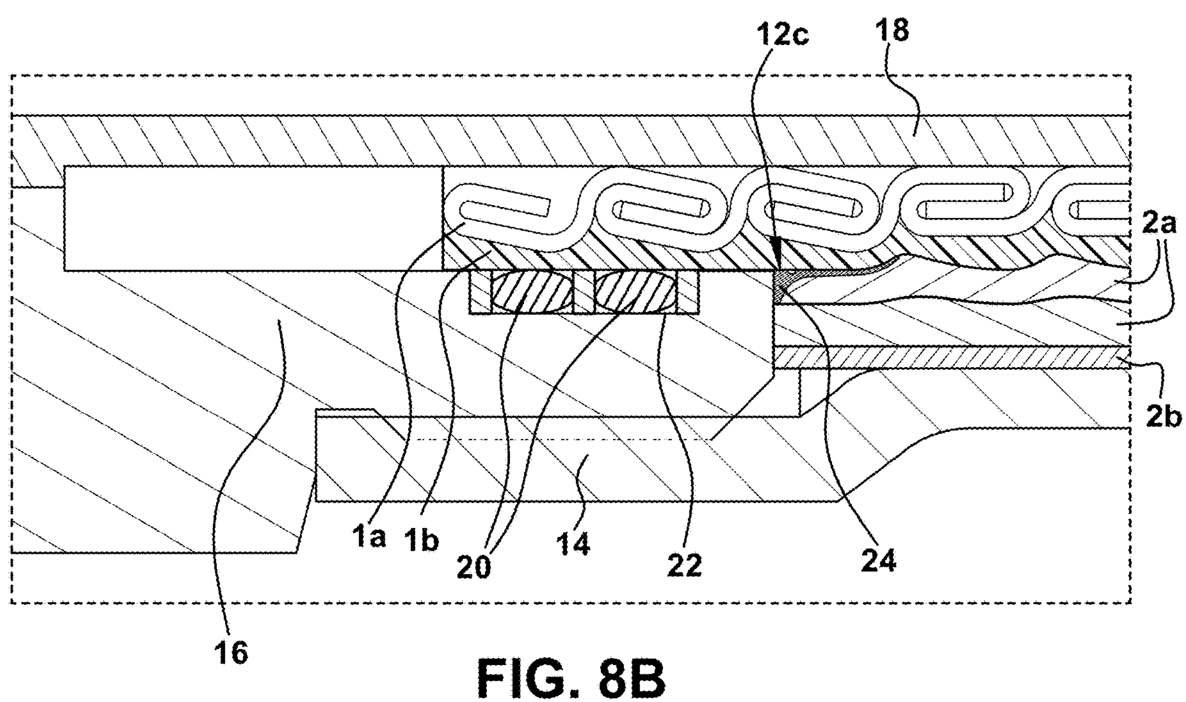
FIG. 8B is an enlarged view of a portion of FIG. 8A.

FIG. 8A is a cross-sectional view of the assembly in FIG. 7B, showing the fitting 16, seals 20, nipple 18, sleeve 14, and respective portions of the hose 12—including the structural carcass 1*a*, core tube 1*b*, fiber reinforcement 2*a*, and outer sheath layer 2*b*. FIG. 8B is an enlarged view of a portion of FIG. 8A. The transition region 12*c* between the skived portion 12*a* and unskived portion 12*b* where a support ring 24 (described below) is also shown in this view. As shown, the sleeve 14 has been inwardly deformed or crimped, engaging an inner surface of the sleeve 14 with a portion of the outer surface of the outer sheath layer 2*b* of the hose 12. The inner portion 1 of the hose including the carcass 1*a* and the core tube 1*b* has been inserted into the inner cavity of the fitting 16. The seal 22 sealingly engages against the outer surface of the core tube 1*b*-1 to prevent ingress of seawater into the hose assembly 50. The rearward end of the rearward fitting end portion 12*b* acts as a stop to restrict the reinforcement layers 2*a* and the outer sheath layer 2*b* from entering the inner cavity of the fitting 16 or otherwise entering further toward the forward fitting end portion 16*a*.

As noted above, the cross-sectional view of FIG. 8B shows an exemplary support ring 24 at the transition region 12*c* between the skived portion 12*a* and unskived portion 12*b*. The support ring 24 is configured to be inserted between and inner portion 1 and an outer portion 2 of the hose 12. More particularly, in exemplary embodiments, the support ring 24 is configured to be inserted between fiber reinforcement 2*a* and polymeric core tube 1*b* of the collapse-resistant hose 12. As shown, because the hose 12 is skived to remove the sheathing/covering 2*b* and fiber 22 a reinforcement to expose the core tube 1*b*, the support ring 24 is inserted at the transition region 12*c* between skived portion 12*a* and unskived portions 12*b* of the hose 12. It has been found that the transition region 12*c* can be a weak point of the assembly that is susceptible to leakage, and the support ring 24 supports the core tube 1*b* in the area between the sealing area of the fitting 16 and the unskived portion 12*b* of the hose 12 to improve performance at the transition region 12*c*.

Figure 9A:
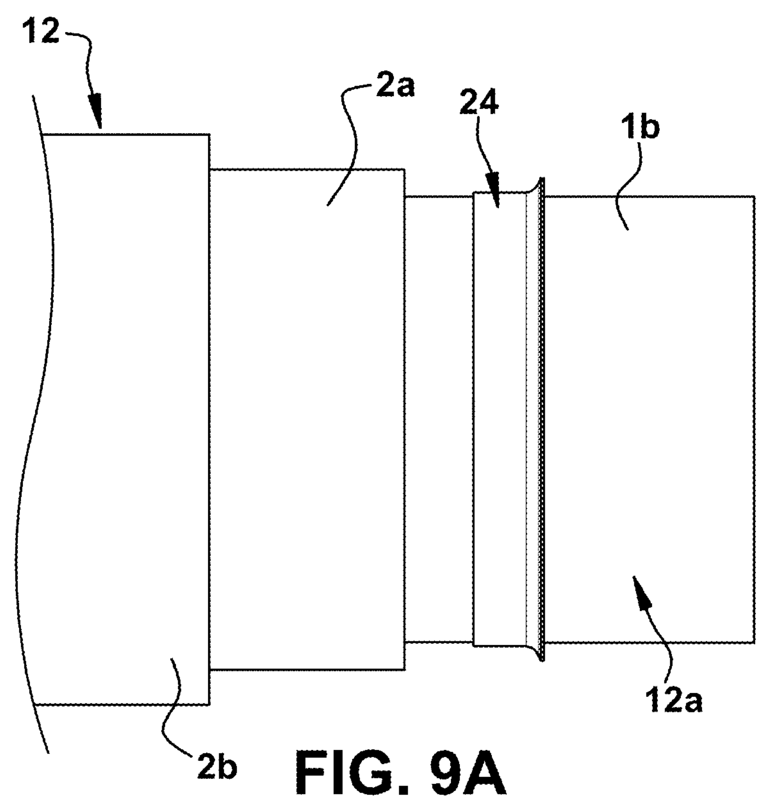
FIGS. 9A and 9B show another exemplary embodiment of a hose fitting assembly for use with collapse-resistant hose, in which an exemplary support ring is configured to be inserted between and inner portion and an outer portion of the hose.
Figure 9B:
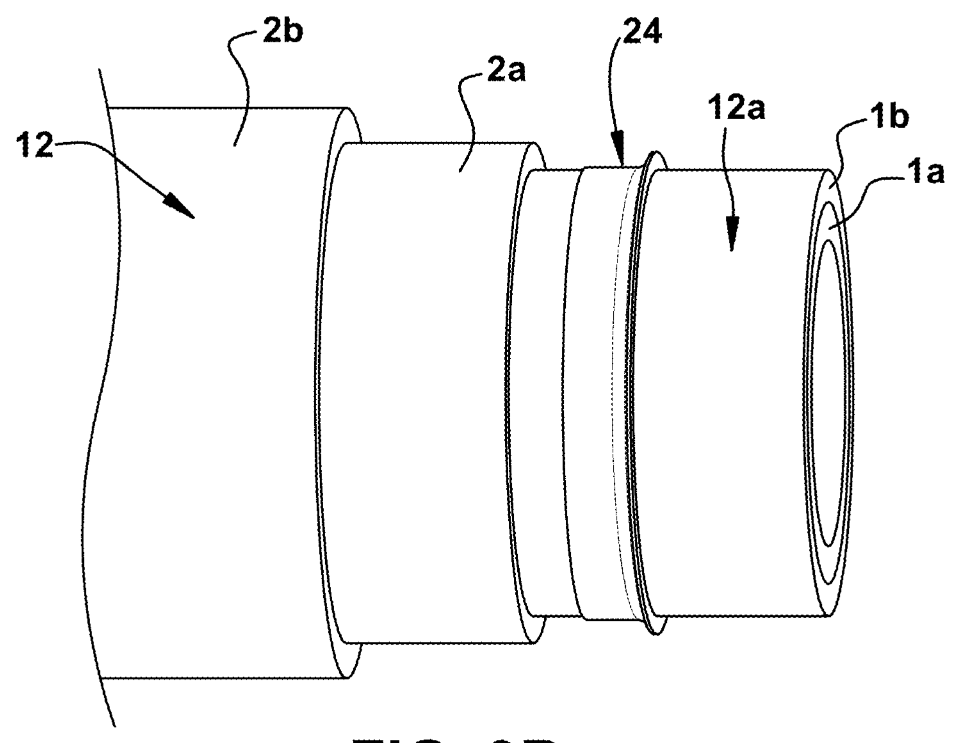

FIGS. 9A and 9B show the support ring 24 placed around the inner portion 12*a* of the hose 12 via the core tube 1*b* after the removal of the outer portion of the hose (i.e. after skiving). As shown, the outer sheath layer 2*b* and the reinforcement layer 2*a* have each been removed from the inner portion of the hose 12*a*. FIG. 9B shows the support ring 24 and hose 12 as shown in 9*a*, with the support ring 14 surrounding both the core tube 1*b* and the carcass 1*a*.

Figure 10A:
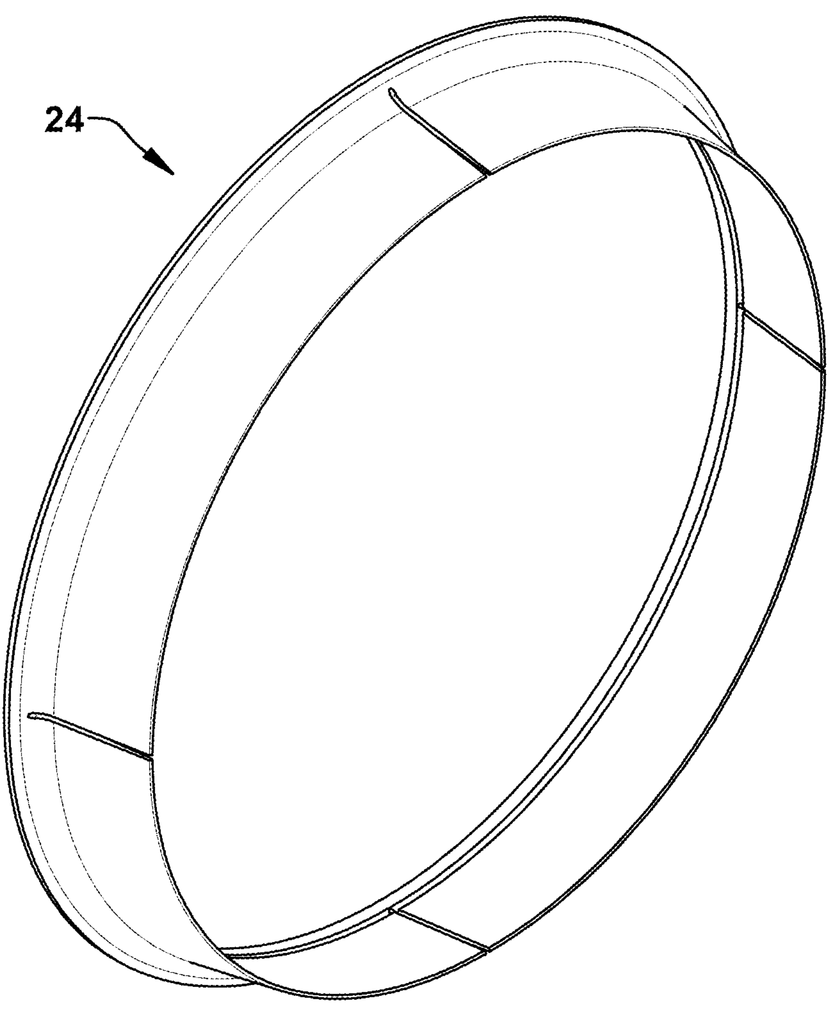
FIGS. 10A and 10B show the support ring in further detail.
Figure 10B:
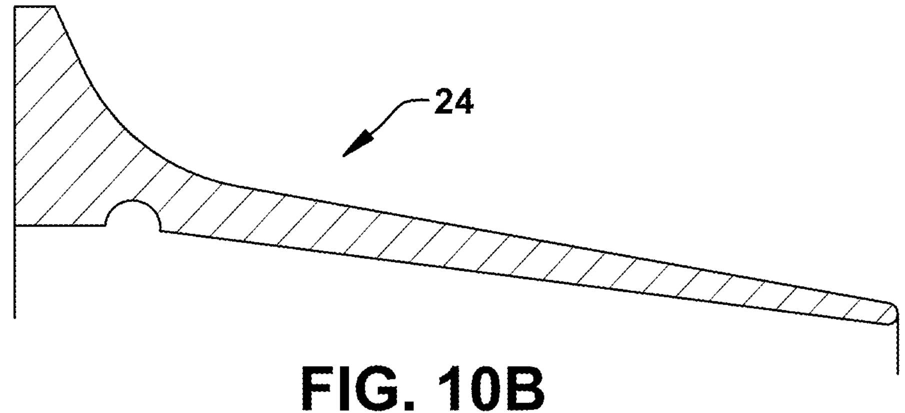

FIGS. 10A and 10B show the support ring 24 in further detail. As shown, the support ring 24 may include a radially enlarged (e.g., flange) portion that is configured to abut the unskived 12*b* region of the hose 16, and an axially elongated extension portion that is configured to fit between the inner portion 1 and outer portion 2 of the hose 12. As shown, the axial extension portion of the support ring 24 may be tapered as it extends rearwardly to facilitate insertion between these portions of the hose 12. This allows the support ring 24 to fit under the fiber reinforcement 2*a* even with tolerance stacking, for example.

Generally, the support ring 24 should be of a sufficient material strength, modulus, resilience, flexibility, and/or other material property or combination thereof to resist localized core tube 1*b* distortion when the hose 12 is pressurized or otherwise operating. In exemplary embodiments, the support ring 24 also includes the extension portion that is thin enough to be pressed under the reinforcement layer 2*a* to a depth that can fully support the transition region 12*c* which may be prone to rupture under pressure and/or stress. To facilitate flexure of the support ring 24 to aid in installation, the support ring 24 may include one or more weakened regions. As shown in FIG. 10A, for example, the weakened regions include collet cuts which are provided to permit flexing due to outer diameter variation of the core tube 1*a*. As shown in FIG. 10B, for example, another weakened region includes an undercut that permits for flexing due to interference fit of the inner diameter support ring 24 with the outer diameter range of the transition region 12*c*.

It is understood that although the support ring 24 is shown as a discrete part, it also could be integrated into part of the fitting 16 where it shoulders or engages against the unskived portion 12*b* of the hose 12. Whether the support ring 24 is unitary or integral with the fitting 16 or a discrete part may be determined by the final geometry of the support ring 24 and which method is most cost effective and/or easy to assemble.

Turning now to FIGS. 11A-11C, another exemplary embodiment of a hose fitting assembly 210 is shown. The hose fitting assembly 210 is substantially the same as the above-referenced hose fitting assembly 10, and consequently the same reference numerals but indexed by 200 are used to denote structures corresponding to similar structures in the hose fitting assembly 210. In addition, the foregoing description of the hose fitting assembly 10 is equally applicable to the hose fitting assembly 210 except as noted below. Moreover, aspects of the hose fitting assemblies 10 and 210 and may be substituted for one another or used in conjunction with one another where applicable.

As shown, the hose fitting assembly 210 includes a sleeve 214 that is configured to receive an end portion of the hose 212, a fitting 216 that is operatively coupled to the sleeve 214, and a nipple 218 operatively coupled to the fitting 216. As described in further detail below, the assembly 210 also includes at least one seal 220 that is operatively mounted to the fitting 216 (such as via seal groove 222), in which the seal 220 is configured to seal against an outer surface (e.g., 202*b*-1) of the hose 212.

FIGS. 12A and 12B show the sleeve 214 in further detail. As shown, the sleeve 214 has a forward sleeve end portion 214*a* and a rearward sleeve end portion 214*b*. The rearward sleeve end portion 214*b* includes an opening 214*i* adapted to receive an end portion of the hose 212. The end portion of the hose 212 which may be received by the rearward sleeve end portion 214*b* may include all of hose layers or a portion of the hose layers. The forward sleeve end portion 214*a* is adapted to operatively couple with the fitting 216 by any suitable means such as threading, welding, brazing, or any other fixing means. In exemplary embodiments, the sleeve 214 may include one or more radially inwardly protruding teeth 214*t* that are configured to cut, grip, and/or bite into the outer portion of the tube 201*b* including but not limited to the outer sheath layer 202*b* when the sleeve 214 is radially inwardly deformed or crimped to the hose 212. This crimping restricts movement of the hose 212 relative to the fitting assembly 210.

The crimping may deform any portion of the sleeve 214, which reduces the diameter of the sleeve 214 to a selected crimp diameter and/or crimp length. As described in further detail below, the crimping also may deform the rearward fitting end portion 216*b* to sealingly engage the seal 220 against the outer surface (e.g., 201*b*-1) of the inner layer (e.g., core tube) of the tube 201*b*. The selected crimping parameters depend on various factors such as the size of the hose 212, the size of the hose fitting assembly 210, the operating conditions, environmental conditions, the material properties of the materials used to construct the hose 212, the materials used to construct the components of the hose fitting assembly 210, or any other number of factors. The deforming or crimping of the hose fitting assembly 210 may utilize any number of suitable means such as manual or automatic hose crimping devices.

Upon crimping, one or more of the teeth 214*t*, ridges, or other features on the sleeve 214 or shell may provide sealing functionality, such as the radially protruding ridge (tooth) shown in FIG. 12*b*. In addition to sealing functionality, the teeth 214*t* may support hose retention during crimping of the hose fitting assembly 210 onto the hose 212 and when the hose 212 is pressurized, operating, being transported, being adjusted, or based on any other considerations before, during, and after the life cycle of the hose 212. The number and thickness of teeth 214*t* may vary depending on the requirements of the finished collapse-resistant hose assembly 250 and ease of manufacture of the sleeve 214.

FIGS. 13A and 13B show the exemplary fitting 216 in further detail. As shown, the fitting 216 includes the rearward fitting end portion 216*b* that is configured to operatively couple to the forward sleeve end portion 214*a* of the sleeve 214. In the illustrated embodiment, the fitting 216 includes threads 216*c* that threadedly engage with corresponding threads 214*c* of the sleeve 214. The rearward fitting end portion 216*b* has an internal surface that forms an internal cavity configured to receive the end portion of the hose 212. In the illustrated embodiment, the internal cavity 216*i* of the fitting 216 is adapted to receive the skived portion 212*a* of the hose 212, and the sleeve 214 is configured to contain the un-skived portion 212*b* of the hose 212 in which either no hose layers are removed, or no portion of the hose layers are removed, including but not limited to the outer sheath layer 202*b*. An end face of the rearward fitting end portion 216*b* may serve as a stop between the skived 212*a* and un-skived portions 212*b* of the hose 212 (as is apparent in FIG. 13B). The stop may restrict at least the end of the outer sheath layer 202*b* from entering the inner cavity of the fitting 216 when the collapse-resistant hose assembly 250 is in both an intermediate uncrimped state and in an assembled and crimped state.

The opposite forward fitting end portion 216*a* is configured to couple to another suitable coupling of the subsea system, such as via a nipple 218 or the like. The fitting 216 may also have any other number of adapters on the forward fitting end portion 216*a* configured to connect the hose fitting assembly 210 with any number of additional hose assemblies, valves, ports, hydraulic systems, fluid sources, or the like for any number of systems. The forward fitting end portion 216*a* may include a male or female adapter of any different size suitable to the application. The forward fitting end portion 216*a* may also include any other number of suitable connectors.

Figure 14A:
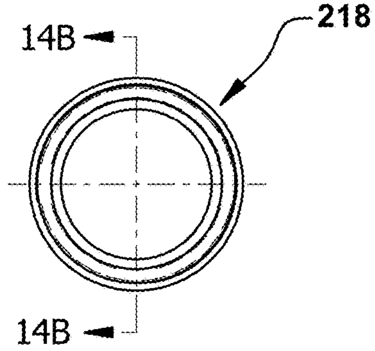
FIGS. 14A and 14B show a nipple of an exemplary fitting assembly according to a second embodiment in further detail.
Figure 14B:
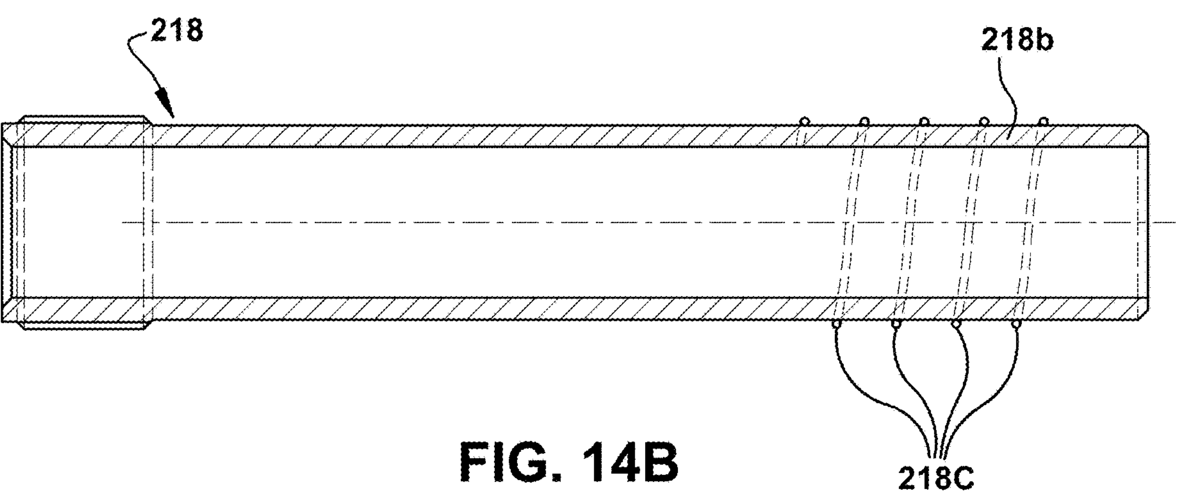

FIGS. 14A and 14B show the nipple 218 in further detail. As shown, the nipple 18 is configured to operatively couple to the inner portion of the fitting 216, such as via threads, press-fitting, or the like. The nipple 218 also could be unitary with the fitting 216 or be fixed to the fitting in any suitable manner such as welded, brazed, or otherwise permanently or removably attached. The nipple 218 extends in a rearward direction through the internal cavity of the fitting 216 and is configured to fit within at least a portion of an internal passage of the hose 212. In exemplary embodiments, the nipple 218 extends beyond the stop formed by the end face of the rearward fitting end portion 216*b*, such that a rearward end of the nipple 18 is surrounded by a portion of the sleeve 214.

As shown in the embodiment of FIG. 14B, the rearward nipple end portion 218*b* may include threading 218*c* along the outer diameter of the nipple 218. This threading 218*c* may be configured to allow the nipple 218 to be threadably engageable with the inside surface of the carcass 201*a* or with any other compatible surface. The forward nipple end portion 218*a* is configured to be inserted into the fitting 216 and the sleeve 214. The nipple 218 has an outer diameter dimension such that it may fit inside an internal passage 212*i* of the hose 212 and the sleeve 214 or shell of the hose fitting assembly 210. An advantage of the threadable nipple 218 is that it helps retain the position of the nipple 218 in the hose interior 212*i* prior to, during, and after crimping. The threading 218*c* prevents the nipple 218 from moving out, or "backing out", of the hose passage 212*i* when the hose is operating under pressure. The threading 218*t* also provides for ease of assembly of the collapse-resistant hose assembly 250. The interlocking members of the carcass may be connected such that they form a threadable surface to which a threaded member of the fitting (e.g., the nipple threads 218*c*) may be threadedly engaged.

Figure 15:
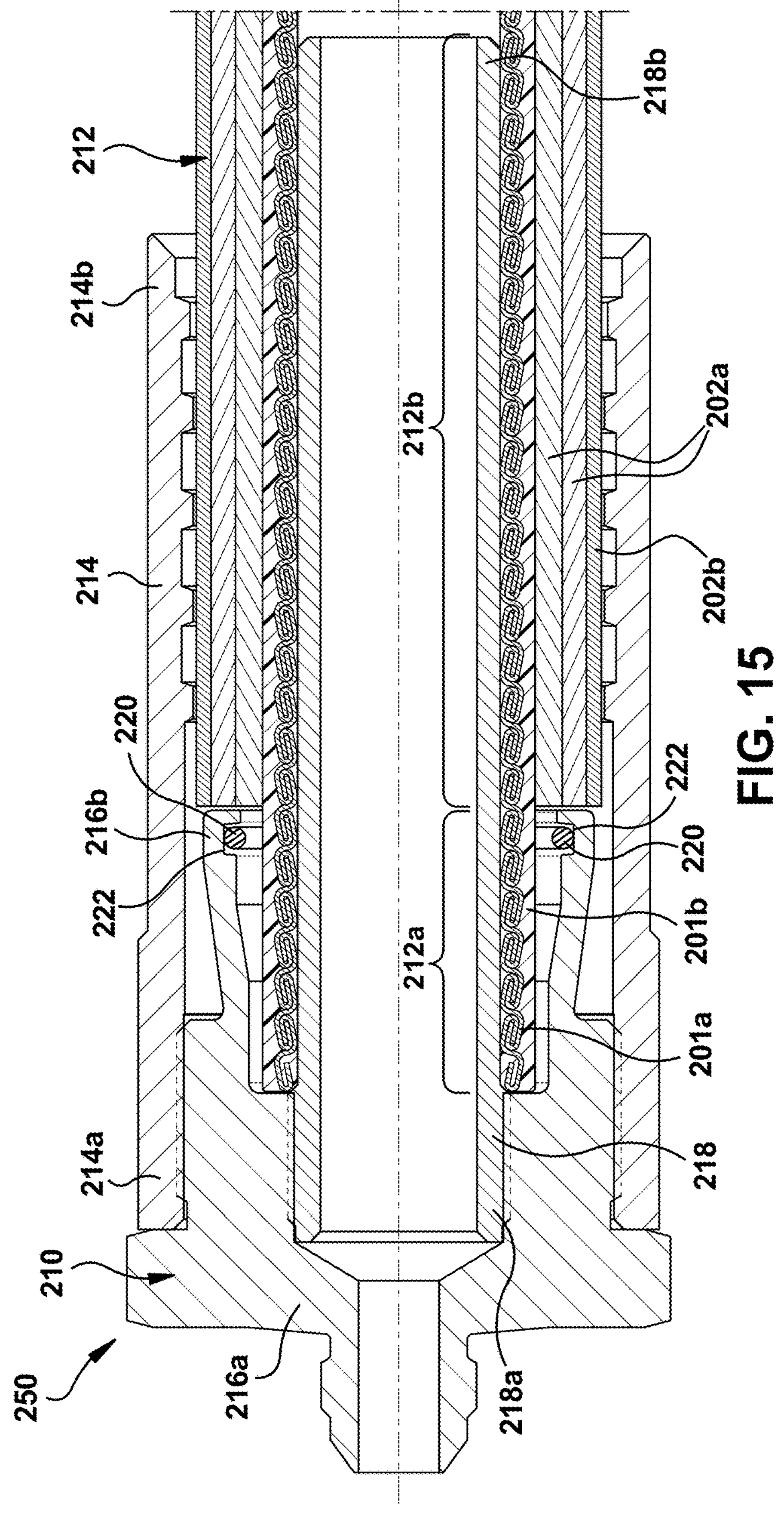
FIG. 15 shows an exemplary assembled and uncrimped collapse-resistant hose assembly according to a second embodiment.

FIG. 15 is a cross-sectional view of the collapse-resistant hose assembly 250 in an intermediate, uncrimped state. As shown in the illustrated state, the hose 212 has been inserted into the hose fitting assembly 210 such that the skived portion 212*a* of the hose 212 is inside of the inner cavity of the fitting 216 and the unskived portion 212*b* has been inserted into the sleeve 214 of the fitting 216 and is stopped by a rearward end of the rearward fitting end portion 216*b*.

In the intermediate uncrimped state, the rearward fitting end portion 216*b* is radially flared outwardly as the rearward fitting end portion 216*b* is extending rearwardly. An advantage of the flared rearward fitting end portion 216*b* is that it enables placement of a seal beneath the fitting 216 with control and with reduced risk of movement of the seal 220 to an undesirable location when the hose 212 is inserted into in the fitting assembly 210. A seal groove 222 is located proximal the rearward end of the rearward fitting end portion 216*b* which allows a seal 220 to be mounted therein. The flared rearward fitting end portion 216*b* may be crimpable to the core tube 201*b*. The sleeve 214 may be crimped or deformed, thereby also crimping, or deforming, the fitting 216.

The seal 220 may seal upon crimping of the fitting 216 onto the core tube 201*b*. Likewise, the seal 220 may seal upon crimping or deforming of at least a portion of the sleeve 214, which in turn crimps or deforms the rearward fitting end portion 216*b* such that the seal 220 seals with the core tube 201*b* or any other outer surface of an inner layer of the hose 212. The seal 220 may have various inner and/or outer diameters based on the desired sealing properties. For example, the seal 220 may have an inner diameter that is smaller than the outer diameter of the core tube 201*b* or smaller than any other desired layer of the collapse-resistant hose 212. The seal 220 may also have an inner diameter that is larger than the outer diameter of the core tube 201*b* of the hose 212 or larger than any other layer of the hose.

The crimping or deformation of the sleeve 214 also may engage at least a portion of the inner surface of the sleeve 214 with at least a portion of the outer surface of the outer sheath layer 202*b* or any other layer directly or indirectly surrounding the innermost layer, carcass 201*a*, or core tube 201*b*. As shown, the inner surface of the sleeve 214 is engaged with the outer surface of the outer sheath layer 202*b*. Upon crimping, the sleeve 214 may compress the hose 212 or any of the layers of the hose 212 based on design requirements, operating requirements, and/or any other considerations. Further, at least a portion of the sleeve 214, when inwardly deformed, may also inwardly deform the rearward fitting end portion 216*b*, compressing the seal 220 into the core tube 201*b*. One or more teeth 214*t* may at least partially penetrate the sheath layer 212*b* or any other layer. This crimping step may be completed in one single step or in multiple steps and the sleeve 214 and or the fitting 216 may be crimped together in one step or in separate or consecutive steps.

Figure 16:
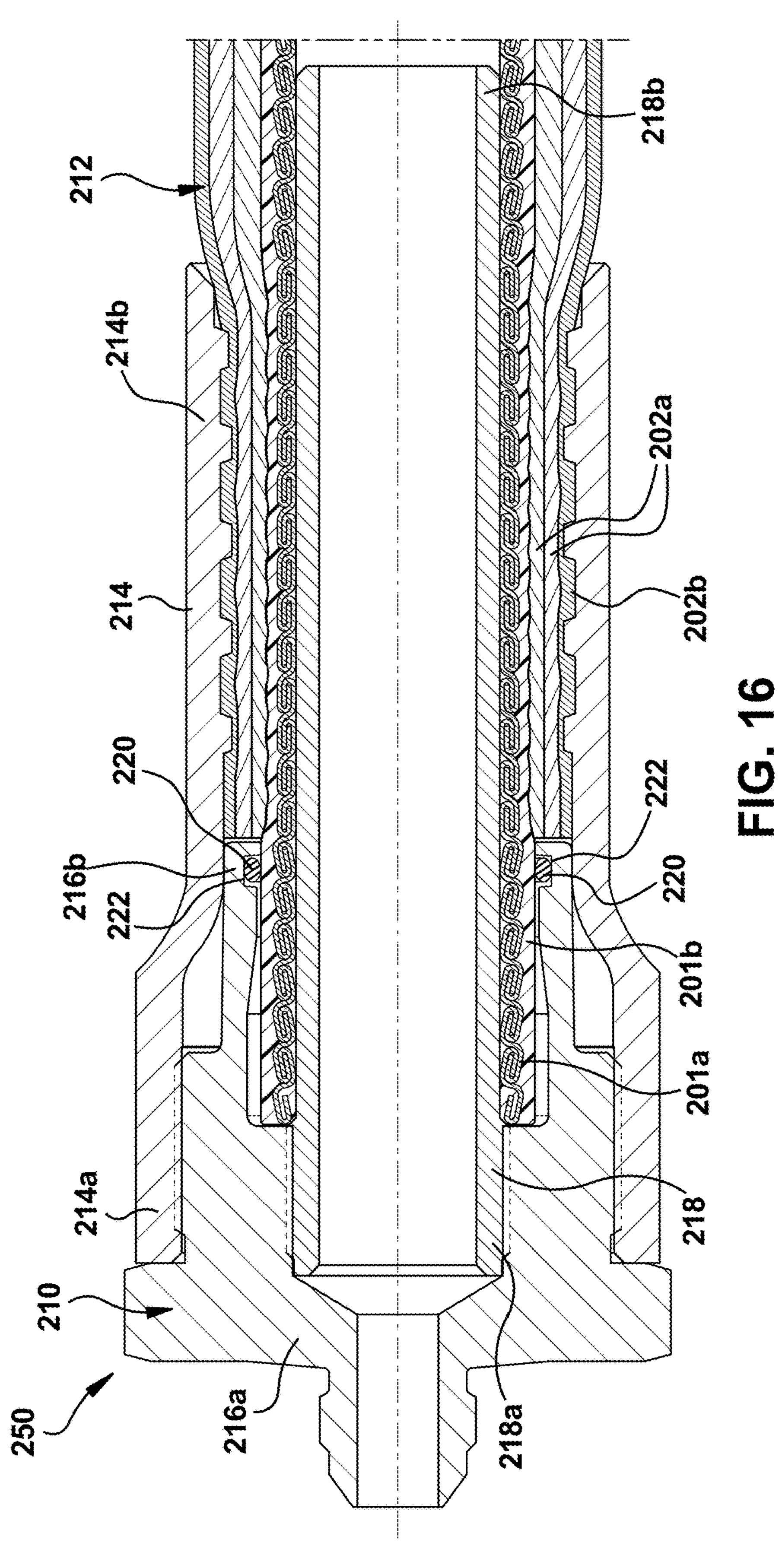
FIG. 16 shows an assembled and crimped collapse-resistant hose assembly according to a second embodiment.

FIG. 16 is the collapse-resistant hose assembly 250 in a final assembled and crimped form. As shown, the sleeve 214 has been inwardly deformed or crimped, engaging an inner surface of the sleeve 214 with a portion of the outer surface of the outer sheath layer 202*b* of the hose 212. The inner portion 1 of the hose including the carcass 201*a* and the core tube 201*b* has been inserted into the inner cavity of the fitting 216. The rearward end of the rearward fitting end portion 216*b* acts as a stop to restrict the reinforcement layers 202*a* and the outer sheath layer 202*b* from entering the inner cavity of the fitting 216. The rearward fitting end portion 216*b* has been inwardly crimped to sealingly engage the seal 220 with the outer surface 201*b*-1 of the core tube 201*b*. As shown, both the sleeve 214 and the fitting 216 are inwardly crimped to engage the seal 220. The crimping process may take place in one step or multiple steps. The sleeve 214 and the fitting 216 may be crimped together simultaneously in the same action, separately in the same action, or one before the other.

Figure 17:
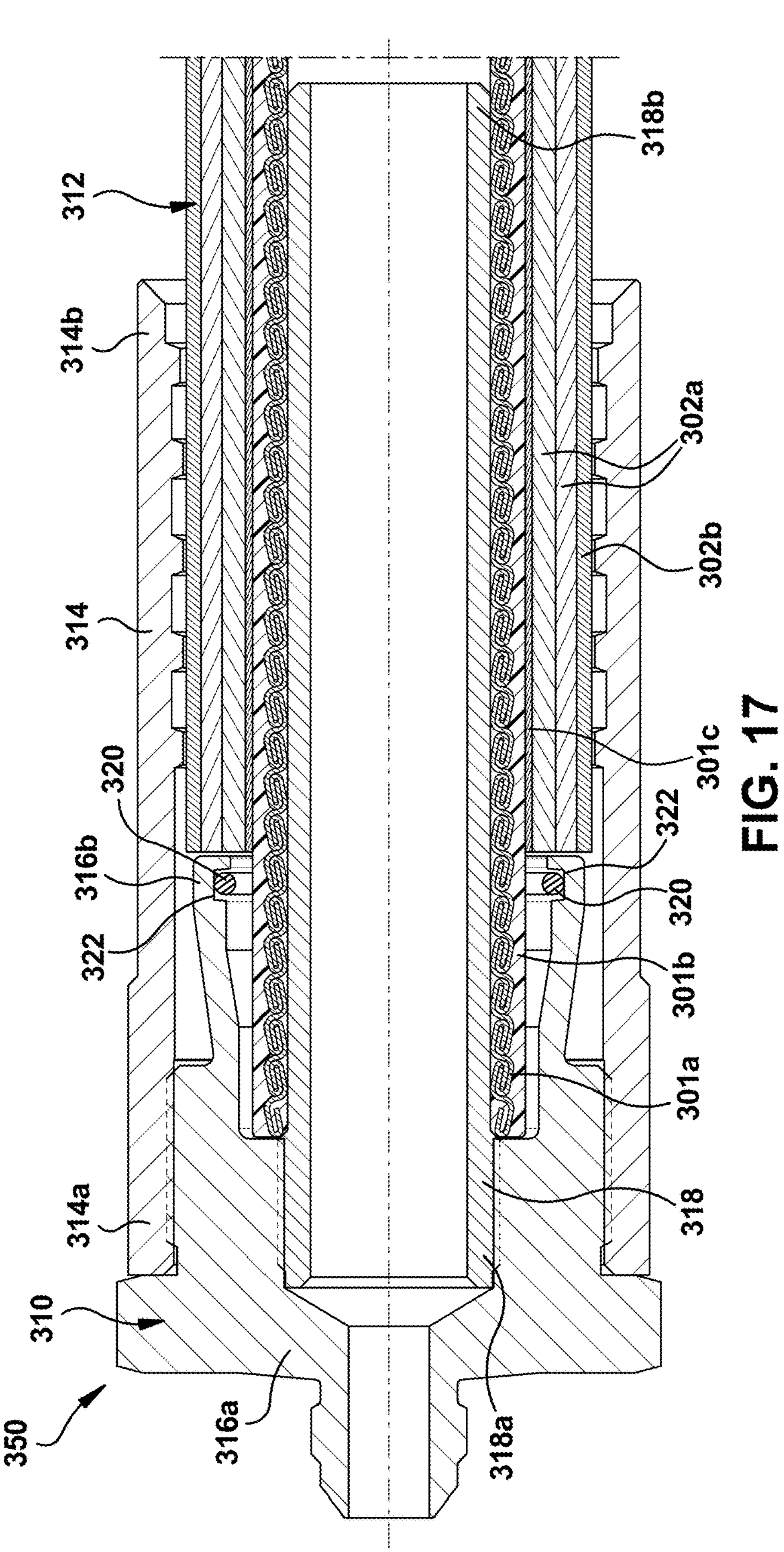
FIG. 17 shows an assembled and uncrimped collapse-resistant hose assembly with an additional unbonded sacrificial layer according to a third embodiment.

Turning now to FIG. 17, another exemplary embodiment of the collapse-resistant hose assembly 350 is shown in further detail. The assembly includes a hose fitting assembly 310 and a collapse-resistant hose 312. The collapse-resistant hose assembly 350 is substantially the same as the above-referenced collapse-resistant hose 250, and consequently the same reference numerals but indexed by 300 are used to denote structures corresponding to similar structures in the collapse-resistant hose assembly 250. In addition, the foregoing description of the collapse-resistant hose assembly 250 is equally applicable to the collapse-resistant hose 350 except as noted below. Moreover, it will be appreciated upon reading and understanding the specification that aspects of the collapse-resistant hose assemblies 250 and 350 and may be substituted for one another or used in conjunction with one another where applicable.

The collapse-resistant hose 312 includes a carcass 301*a*, a core tube 301*b*, a sacrificial unbonded tube layer 301*c*, at least one reinforcement layer 302*a*, and a cover layer 302*b*. The sacrificial unbonded tube layer 301*c* surrounds the core tube 301*b* but the sacrificial layer 301*c* is not bonded to the core tube 301*b* using any sort of adhesive or other bonding means. Because of the lack of bonding between the sacrificial layer 301*c* and the core tube layer 301*b*, there is ease of removal of at least the sacrificial layer 301*c* during the skiving process. The sacrificial layer 301*c* may or may not be bonded to one or more of the reinforcement layers 302*a* using any adhesive means such as chemical adhesive coating or a physical adhesive.

During the skiving step, the outer sheath layer 302*b*, the reinforcement layer or layers 302*a*, and the sacrificial layer 301*c* may be simultaneously removed using any suitable cutting means. The sacrificial layer 301*c* may facilitate ease of removal of the reinforcement layer or any other outer layer by functioning as a cutting board, scoring board, or backstop to which a cutting means may be applied. The sacrificial layer 301*c* may be made of an easily scorable, cuttable, peelable, and/or tearable material such that it may easily peel or otherwise be removed from the core tube 301*b* after the outer surface 301*c*-1 of the sacrificial tube 301*c* has been physically scored or partially cut. This may allow for ease of removal of the layers surrounding the sacrificial layer 301*c* during the skiving process while also having an additional potential benefit of a reduced or negligible risk of cutting, scoring, or otherwise damaging the core tube 301*a*. This may further allow for a decreased risk of hose failure during operation or assembly.

During assembly of the collapse-resistant hose assembly 350 with the collapse-resistant hose 312, the skiving step removes the outer sheath layer 302*b*, the reinforcement layer or layers 302*a*, and the sacrificial unbonded tube layer 201*c*. This creates an unskived portion 312*b* of the hose 312 and a skived portion 312*a* of the hose 312. The skived portion 312*a* includes the exposed core tube 301*b* and the carcass 301*a*. The unskived portion 312*b* includes the sacrificial core tube layer 301*c*. To assemble the hose fitting assembly 310 with the hose 312, the skived portion 312*a* is inserted into the inner cavity of the fitting 316. The rearward end portion 316*b* of the fitting 316 acts as a stop which restricts the sacrificial unbonded tube layer 301*c*, the reinforcement layer(s) 302*a*, and the outer sheath layer 302*b* from entering the inner cavity of the fitting 316. The exposed ends of the outer layers abut and/or engage with the rearward end of the rearward end portion 316*b*. When in an uncrimped but assembled state, the sleeve 316 surrounds at least a portion of the outer sheath layer 302*b* of the hose 312 and the outer surface of the rearward end portion of the fitting 316.

Figure 18:
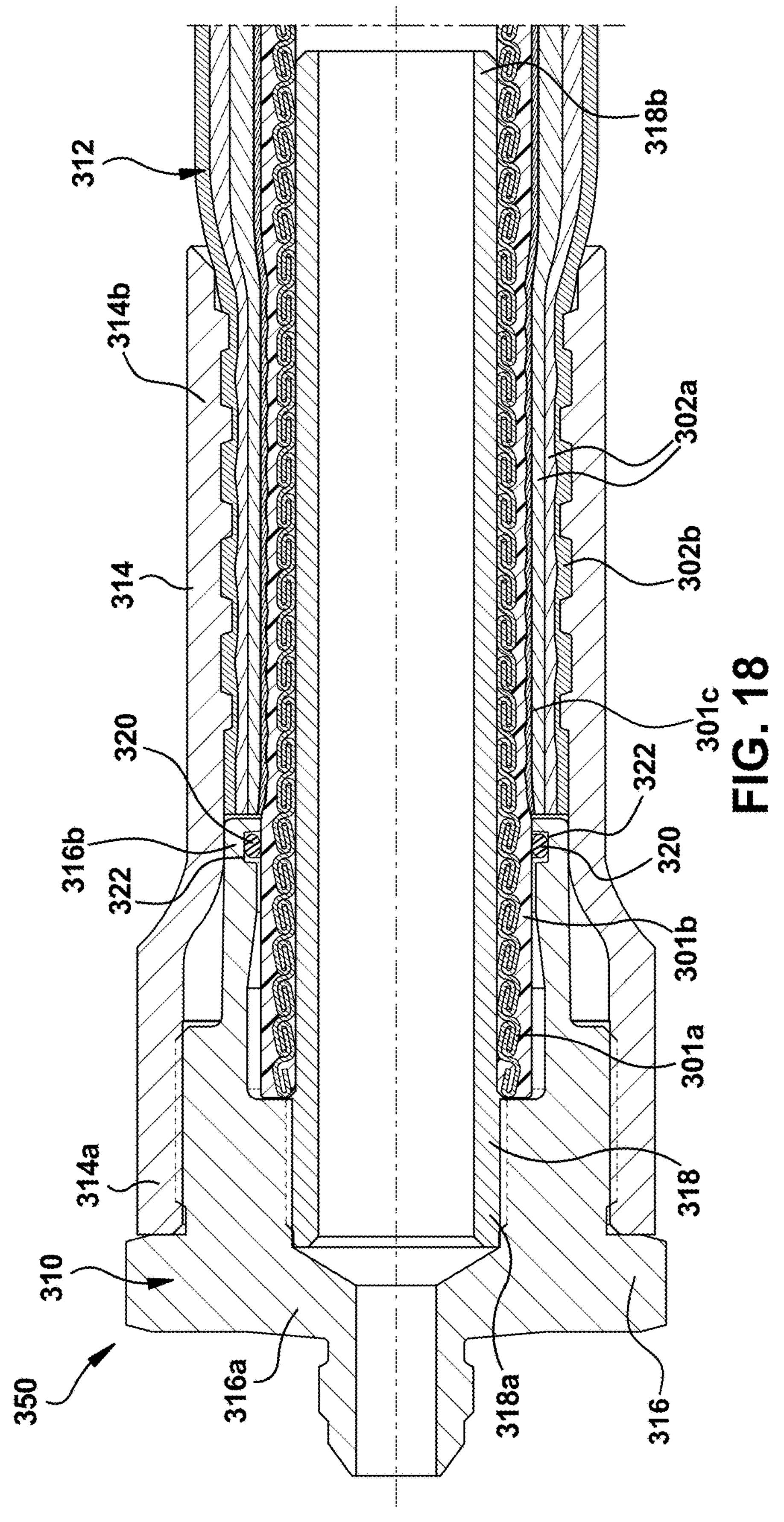
FIG. 18 shows an assembled and crimped collapse-resistant hose assembly with a sacrificial layer according to a third embodiment.

FIG. 18 shows an assembled and crimped collapse-resistant hose assembly 350 including a hose fitting assembly 310 and a collapse resistant hose 312 shown in FIG. 17. FIG. 18 shows that when the collapse-resistant hose assembly 350 is in crimped form, that the sacrificial layer remains substantially in the same region as the reinforcement 302*a* and/or outer sheath layer 302*b* and is typically not crimped beneath the inner surface of the fitting 316.

According to an aspect, a hose fitting assembly for a collapse-resistant hose is provided with at least one inner layer and an outer sheath layer, the hose fitting assembly including: a sleeve having a forward sleeve end portion and a rearward sleeve end portion, the rearward sleeve end portion having an opening adapted to receive an end portion of the collapse-resistant hose; a fitting having a rearward fitting end portion that is operatively coupled to the forward sleeve end portion; the rearward fitting end portion having an internal surface that forms an internal cavity configured to receive an end portion of the at least one inner layer of the collapse-resistant hose; a nipple operatively coupled to the fitting and extending in a rearward direction through the internal cavity of the fitting, the nipple being configured to fit within an internal passage of the collapse-resistant hose; and at least one seal operatively mounted in the internal cavity of the fitting and configured to seal against an outer surface of the at least one inner layer of the collapse-resistant hose.

Embodiments may include one or more of the following additional features, separately or in any combination.

According to an embodiment of any paragraph(s) of this disclosure, the rearward fitting end portion is flared radially outwardly to receive the end portion of the collapse-resistant hose and is configured to be crimped radially inwardly into a sealed state in which the at least one seal engages with the outer surface of the at least one inner layer of the collapse-resistant hose.

According to an embodiment of any paragraph(s) of this disclosure, an inner surface of the sleeve is configured to engage the outer surface of the radially outwardly flared rearward fitting end portion when the hose fitting assembly is in a radially inwardly crimped state.

According to an embodiment of any paragraph(s) of this disclosure an inner surface of the sleeve is configured to engage with an outer surface of at least one hose layer when the hose fitting assembly is in a radially inwardly crimped state.

According to an embodiment of any paragraph(s) of this disclosure the inner surface of the sleeve comprises at least one tooth configured to penetrate at least a portion of at least one hose layer.

According to an embodiment of any paragraph(s) of this disclosure the nipple has an outward thread that is configured to threadedly engage with an inner surface including the inner passage of the collapse-resistant hose.

According to an embodiment of any paragraph(s) of this disclosure, at least a portion of the rearward fitting end portion restricts at least the outer sheath layer from entering the internal cavity of the fitting.

According to an embodiment of any paragraph(s) of this disclosure the at least one seal is mounted in at least one seal groove in an inner surface of the outwardly flared rearward fitting end portion.

According to another aspect of this disclosure, a collapse-resistant hose assembly is provided which includes the hose fitting assembly and the collapse-resistant hose, wherein the collapse-resistant hose includes an inner portion including a structural carcass, a core tube and an outer portion, the outer portion including a fiber-reinforced layer and an outer sheath layer.

According to an embodiment of any paragraph(s) of this disclosure, the outer surface of the at least one inner layer of the collapse-resistant hose upon which the at least one seal is engaged is at least one core tube of the collapse-resistant hose, and the inner diameter of the at least one seal is smaller than the outer diameter of the outer surface of the at least one inner layer of the collapse-resistant hose, resulting in interference and sealing upon assembly.

According to an embodiment of any paragraph(s) of this disclosure, at least an inner surface including an inner passage of the structural carcass is threadedly engageable with the nipple.

According to an embodiment of any paragraph(s) of this disclosure the collapse-resistant hose further comprises: a sacrificial unbonded tube layer surrounding, but not bonded to, the core tube.

According to another aspect of this disclosure, a method of assembling a collapse-resistant hose assembly is provided which includes: providing a hose fitting assembly including a sleeve, a nipple, and a fitting, wherein the fitting includes a rearward fitting end portion; providing a collapse-resistant hose with at least one inner layer and at least one outer sheath layer; removing at least an end portion of at least the outer sheath layer to expose an outer surface of the at least one inner layer; inserting the end of the at least one inner layer of the collapse-resistant hose into the hose fitting assembly to form an uncrimped intermediate state; and deforming at least the rearward fitting end portion radially inwardly to engage at least one seal with at least one outer surface of the at least one inner layer of the collapse-resistant hose.

According to an embodiment of any paragraph(s) of this disclosure the nipple is inserted into the inner surface of the end portion of the collapse resistant hose by threading the nipple into the inner surface of the collapse-resistant hose.

According to an embodiment of any paragraph(s) of this disclosure the inner surface of the collapse-resistant hose comprises a structural carcass.

According to an embodiment of any paragraph(s) of this disclosure, the method further includes radially inwardly deforming the outer surface of the sleeve such that the inner surface of the sleeve is radially inwardly deformed to engage with the outer surface of the rearward fitting end portion; wherein the rearward fitting end portion is radially inwardly deformed when engaged with the inner surface of the radially inwardly deformed sleeve; and wherein the radially inwardly deformed rearward fitting end portion compresses the at least one seal such that it seals to an outer surface of the at least one inner layer of the collapse-resistant hose.

According to an embodiment of any paragraph(s) of this disclosure, a sacrificial unbonded tube layer is removed simultaneously or in conjunction with the removal of at least the outer sheath layer.

According to an embodiment of any paragraph(s) of this disclosure the inner surface of the radially inwardly deformed sleeve engages with the outer sheath layer.

According to an embodiment of any paragraph(s) of this disclosure, at least one tooth on the inner surface of the sleeve penetrates at least a portion of a hose layer when the sleeve is radially inwardly deformed.

According to an embodiment of any paragraph(s) of this disclosure, at least a rearward end of the rearward fitting end portion acts as a stop to restrict at least the outer sheath layer from entering an inner cavity of the fitting.

According to another aspect, a collapse-resistant hose assembly includes a hose fitting assembly and the collapse-resistant hose, wherein the collapse-resistant hose includes: an inner portion including a structural carcass, a core tube and an outer portion, the outer portion including a fiber-reinforced layer and an outer sheath layer; and a sacrificial unbonded tube layer surrounding, but not bonded to, the core tube.

As used herein, an “operative connection,” or a connection by which entities are “operatively connected,” is one in which the entities are connected in such a way that the entities may perform as intended. An operative connection may be a direct connection or an indirect connection in which an intermediate entity or entities cooperate or otherwise are part of the connection or are in between the operatively connected entities. An operative connection or coupling may include the entities being integral and unitary with each other.

It is to be understood that terms such as “top,” “bottom,” “upper,” “lower,” “left,” “right,” “front,” “rear,” “forward,” “rearward,” and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to “a,” “an,” and/or “the” may include one or more than one, and that reference to an item in the singular may also include the item in the plural.

The term “about” as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase “and/or” should be understood to mean “either or both” of the elements so conjoined, i.e., elements that are conjunctively present in some cases and disjunctively present in other cases. Other elements may optionally be present other than the elements specifically identified by the “and/or” clause, whether related or unrelated to those elements specifically identified unless clearly indicated to the contrary. Thus, as a non-limiting example, a reference to “A and/or B,” when used in conjunction with open-ended language such as “comprising” can refer, in one embodiment, to A without B (optionally including elements other than B); in another embodiment, to B without A (optionally including elements other than A); in yet another embodiment, to both A and B (optionally including other elements); etc.

The word “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” may refer to the inclusion of exactly one element of a number or list of elements. In general, the term “or” as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hose fitting assembly for a collapse-resistant hose with at least one inner layer and an outer sheath layer, the hose fitting assembly comprising:

a sleeve having a forward sleeve end portion and a rearward sleeve end portion, the rearward sleeve end portion having an opening adapted to receive an end portion of the collapse-resistant hose;

a fitting having a rearward fitting end portion that is operatively coupled to the forward sleeve end portion;

the rearward fitting end portion having an internal surface that forms an internal cavity configured to receive an end portion of the at least one inner layer of the collapse-resistant hose;

a nipple operatively coupled to the fitting and extending in a rearward direction through the internal cavity of the fitting, the nipple being configured to fit within an internal passage of the collapse-resistant hose;

wherein the rearward fitting end portion is flared radially outwardly to receive the end portion of the collapse-resistant hose and is configured to be crimped radially inwardly into a sealed state with an outer surface of the at least one inner layer of the collapse-resistant hose; and in the sealed state, the rearward sleeve end portion is radially compressed relative to the forward sleeve end portion and directly against the rearward fitting end portion of the fitting.

2. The hose fitting assembly according to claim 1, wherein an inner surface of the sleeve is configured to engage an outer surface of the rearward fitting end portion when the hose fitting assembly is in a radially inwardly crimped state.

3. The hose fitting assembly according to claim 2, wherein the inner surface of the sleeve is configured to engage with an outer surface of at least one hose layer when the hose fitting assembly is in the radially inwardly crimped state.

4. The hose fitting assembly according to claim 3, wherein the inner surface of the sleeve comprises at least one tooth configured to engage at least a portion of the outer sheath layer of the hose.

5. The hose fitting assembly according to claim 4, wherein the nipple has an outward thread that is configured to threadedly engage with an inner surface of the collapse-resistant hose that forms an internal fluid passage of the hose.

6. The hose fitting assembly according to claim 5, wherein at least a portion of the rearward fitting end portion restricts at least the outer sheath layer from entering the internal cavity of the fitting.

7. The hose fitting assembly according to claim 1, wherein:

the hose fitting assembly has an uncrimped state in which the rearward fitting end portion is flared radially outwardly;

the hose fitting assembly has an uncrimped intermediate state in which the end portion of the collapse-resistant hose is inserted into the opening of the rearward sleeve end portion; and the hose fitting assembly has a sealed state in which the rearward fitting end portion is radially inwardly crimped.

8. The hose fitting assembly according to claim 1, further comprising an elastomeric seal operatively mounted in the internal cavity of the fitting and configured to seal against the outer surface of the at least one inner layer of the collapse-resistant hose, wherein the rearward fitting end portion is crimped radially inwardly into the sealed state with the outer surface of the at least one inner layer of the collapse-resistant hose.

9. The hose fitting assembly according to claim 8, wherein the elastomeric seal is mounted in at least one seal groove in an inner surface of the outwardly flared rearward fitting end portion.

10. A collapse-resistant hose assembly comprising the hose fitting assembly according to claim 1, and the collapse-resistant hose; wherein:

the collapse-resistant hose comprises an inner portion, a core tube, and an outer portion;

the inner portion includes a structural carcass; and the outer portion includes a fiber-reinforced layer and the outer sheath layer.

11. The collapse-resistant hose assembly according to claim 10, further comprising an elastomeric seal operatively mounted in the internal cavity of the fitting and configured to seal against the outer surface of the at least one inner layer of the collapse-resistant hose;

wherein the rearward fitting end portion is crimped radially inwardly into a sealed state with the outer surface of the at least one inner layer of the collapse-resistant hose; and wherein the outer surface of the at least one inner layer of the collapse-resistant hose upon which the elastomeric seal is engaged is at least one core tube of the collapse-resistant hose.

12. The collapse-resistant hose assembly according to claim 10, wherein at least an inner surface comprises an inner passage of the structural carcass is threadedly engageable with the nipple.

13. The collapse-resistant hose assembly according to claim 10, wherein the collapse-resistant hose further comprises a sacrificial unbonded tube layer surrounding, but not bonded to, the core tube.

14. A collapse-resistant hose assembly comprising the hose fitting assembly according to claim 7, and the collapse-resistant hose; wherein:

the collapse-resistant hose comprises an inner portion, a core tube, and an outer portion;

the inner portion includes a structural carcass; and the outer portion includes a fiber-reinforced layer and the outer sheath layer.

* * * * *